US011892652B1

(12) United States Patent
Belloni

(10) Patent No.: US 11,892,652 B1
(45) Date of Patent: Feb. 6, 2024

(54) LENSES FOR 2D PLANAR AND CURVED 3D LASER SHEETS

(71) Applicant: Mark Belloni, Brewster, OH (US)

(72) Inventor: Mark Belloni, Brewster, OH (US)

( * ) Notice: Subject to any disclaimer, the term of this patent is extended or adjusted under 35 U.S.C. 154(b) by 756 days.

(21) Appl. No.: 17/029,790

(22) Filed: Sep. 23, 2020

Related U.S. Application Data

(60) Provisional application No. 63/006,113, filed on Apr. 7, 2020.

(51) Int. Cl.
*G02B 27/09* (2006.01)
*G02B 1/10* (2015.01)

(52) U.S. Cl.
CPC .......... *G02B 27/0927* (2013.01); *G02B 1/10* (2013.01); *G02B 27/0966* (2013.01)

(58) Field of Classification Search
CPC .. G02B 27/0927; G02B 1/10; G02B 27/0966; G02B 27/00; G02B 27/09; G02B 5/32; G02B 27/0955; G02B 3/02; G01B 11/14; G01S 7/481; G01S 7/4811
See application file for complete search history.

(56) References Cited

U.S. PATENT DOCUMENTS

| | | | |
|---|---|---|---|
| 4,170,417 A | 10/1979 | Tourres | |
| RE32,988 E | 7/1989 | Smid | |
| 5,225,928 A | 7/1993 | Dugan | |
| 5,504,350 A * | 4/1996 | Ortyn | G02B 6/4204 372/50.23 |
| 5,613,769 A | 3/1997 | Parkyn, Jr. et al. | |
| 5,655,832 A | 8/1997 | Pelka et al. | |
| 5,676,453 A | 10/1997 | Parkyn, Jr. et al. | |
| 5,806,955 A | 9/1998 | Parkyn, Jr. et al. | |
| 6,160,934 A | 12/2000 | Beach et al. | |
| 6,336,738 B1 | 1/2002 | Feuermann et al. | |
| 6,347,109 B1 | 2/2002 | Beach et al. | |
| 6,377,403 B1 | 4/2002 | Smith | |
| 6,634,753 B1 | 10/2003 | Rozenman | |
| 6,643,311 B2 | 11/2003 | Krupke | |
| 6,936,855 B1 | 8/2005 | Harrah | |
| 7,061,958 B2 | 6/2006 | Krupke | |
| 7,061,960 B2 | 6/2006 | Krupke | |
| 7,140,763 B1 | 11/2006 | Keith-Wolfe | |

(Continued)

OTHER PUBLICATIONS

360 Degree Laser Reflecting Cone Lens For Laser Line Circle/Laser Level Use DIY—AliExpress; https://www.aliexpress.us/item/2255799834200608.html?gatewayAdapt=glo2usa4itemAdapt, pp. 1-4; Last Accessed Nov. 6, 2023.

(Continued)

*Primary Examiner* — Balram T Parbadia
(74) *Attorney, Agent, or Firm* — Pearne & Gordon LLP

(57) ABSTRACT

Various lens shapes are able to transform laser beams into laser sheets that can span both two-dimensional (2D) and three-dimensional (3D) space in a controlled manner. The electromagnetic characteristics of the laser beams can be tailored as the laser light enters, traverses, and exits a lens. The projected image can be shaped. The lenses may have sections being multiply or simply connected with or without cavities. The lenses may also have solid or hollow race features, and coatings and/or material layers, which affect the output laser sheet. A fan angle of the produced laser sheet can be up to and include 360 degrees.

20 Claims, 35 Drawing Sheets

(56) References Cited

U.S. PATENT DOCUMENTS

| | | |
|---|---|---|
| 7,213,940 B1 | 5/2007 | Van De Ven et al. |
| 7,546,010 B2 | 6/2009 | Fujii et al. |
| 7,577,492 B2 | 8/2009 | Kamiya et al. |
| 7,614,759 B2 | 11/2009 | Negley |
| 7,642,521 B2 | 1/2010 | Willi et al. |
| 7,722,220 B2 | 5/2010 | Van De Ven |
| 7,744,243 B2 | 6/2010 | Van De Ven et al. |
| 7,768,192 B2 | 8/2010 | Van De Ven et al. |
| 7,796,173 B2 | 9/2010 | Lettvin |
| 7,841,741 B2 | 11/2010 | Chan et al. |
| 7,898,749 B2 | 3/2011 | Ford et al. |
| 7,901,107 B2 | 3/2011 | Van De Ven et al. |
| 7,969,549 B2 | 6/2011 | Boom et al. |
| 8,038,317 B2 | 10/2011 | Van De Ven et al. |
| 8,079,729 B2 | 12/2011 | Van De Ven et al. |
| 8,097,926 B2 | 1/2012 | De Graff et al. |
| 8,112,921 B2 | 2/2012 | Van De Ven et al. |
| 8,120,128 B2 | 2/2012 | Matsumoto |
| 8,217,897 B2 | 4/2012 | Lutian |
| 8,174,205 B2 | 5/2012 | Myers et al. |
| 8,237,912 B2 | 8/2012 | Boom et al. |
| 8,276,819 B2 | 10/2012 | Canini et al. |
| 8,310,143 B2 | 11/2012 | Van De Ven et al. |
| 8,328,376 B2 | 12/2012 | Negley |
| 8,335,420 B2 | 12/2012 | Beach et al. |
| 8,337,071 B2 | 12/2012 | Negley et al. |
| 8,357,553 B2 | 1/2013 | Veerasamy et al. |
| 8,372,726 B2 | 2/2013 | De Graff et al. |
| 8,403,531 B2 | 3/2013 | Negley et al. |
| 8,441,206 B2 | 5/2013 | Myers et al. |
| 8,492,788 B2 | 7/2013 | Veerasamy et al. |
| 8,536,667 B2 | 9/2013 | De Graff et al. |
| 8,573,804 B2 | 11/2013 | Veerasamy et al. |
| 8,596,819 B2 | 12/2013 | Negley et al. |
| 8,628,214 B2 | 1/2014 | Negley et al. |
| 8,759,855 B2 | 6/2014 | Kamada |
| 8,854,737 B2 | 10/2014 | Nagano et al. |
| 8,858,004 B2 | 10/2014 | Negley |
| 8,878,429 B2 | 11/2014 | Van De Ven et al. |
| 8,889,251 B2 | 11/2014 | Soules et al. |
| 8,917,315 B2 | 12/2014 | Negishi |
| 8,981,677 B2 | 3/2015 | Myers et al. |
| 9,036,251 B2 | 5/2015 | Nowak et al. |
| 9,042,422 B2 | 5/2015 | Muro et al. |
| 9,494,533 B2 | 11/2016 | Orlov et al. |
| 10,184,218 B1 | 1/2019 | Belloni et al. |
| 10,422,998 B1 | 9/2019 | Belloni |
| 2002/0145042 A1* | 10/2002 | Knowles ............... G02B 26/10 235/462.01 |
| 2003/0026000 A1* | 2/2003 | Deckenbach .......... G02B 27/09 359/624 |
| 2007/0028469 A1* | 2/2007 | Nash .................... G01C 15/004 33/286 |
| 2019/0361569 A1* | 11/2019 | Zhang ................. H04N 9/3194 |
| 2020/0089011 A1* | 3/2020 | Redpath .................. A62B 5/00 |
| 2020/0251886 A1* | 8/2020 | Kuo ....................... G02B 27/20 |
| 2022/0035078 A1* | 2/2022 | Cramer ............. G02B 27/0905 |
| 2022/0057336 A1* | 2/2022 | Pearson ................. H04N 23/74 |
| 2022/0091429 A1* | 3/2022 | Hollows ........... G02B 27/0927 |

OTHER PUBLICATIONS

Laser Optics | Edmund Optics; https://www.edmundoptics.com/capabilities/laser-optics; pp. 1-5; Last Accessed Nov. 6, 2023.

\* cited by examiner

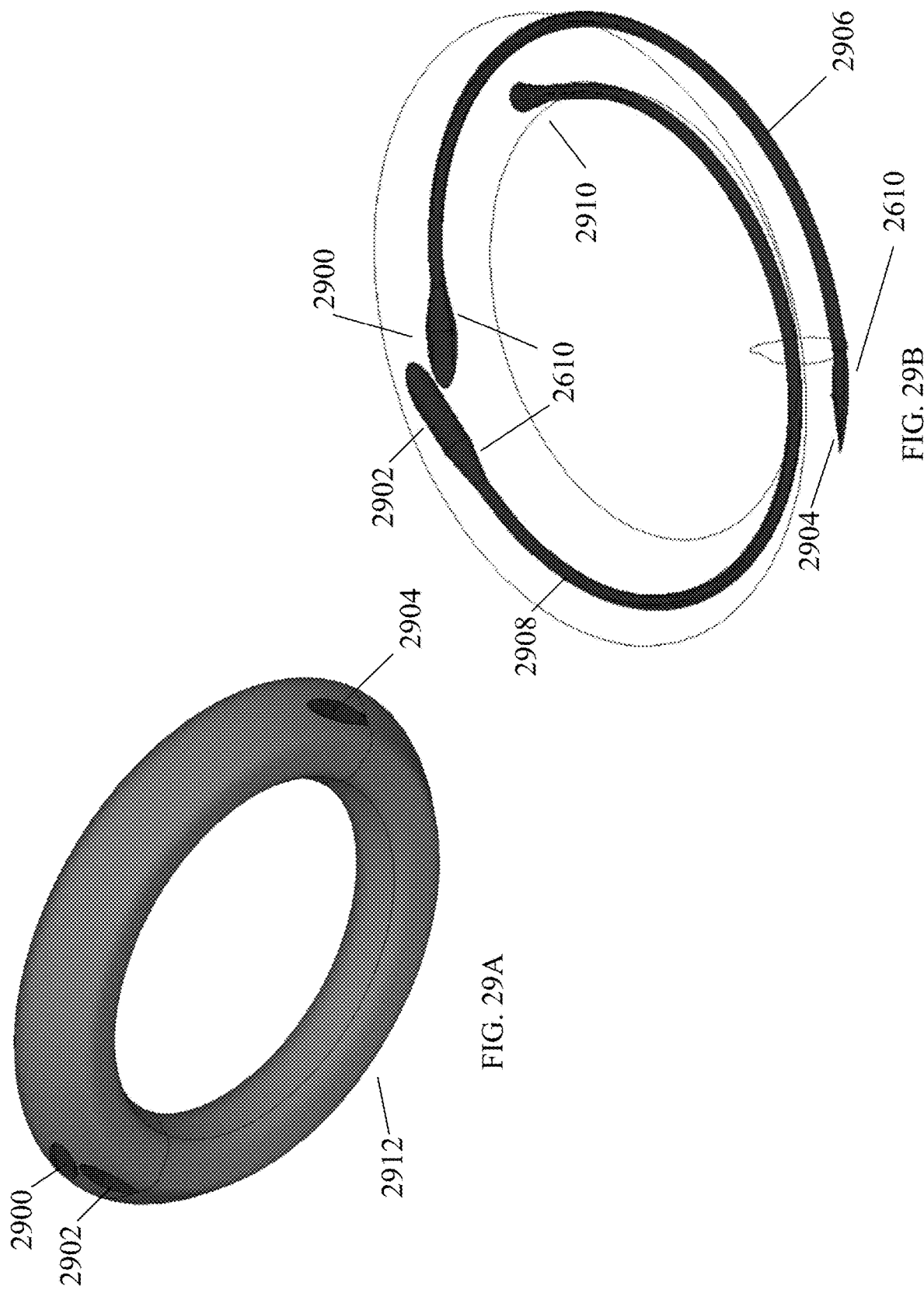

LENSES FOR 2D PLANAR AND CURVED 3D LASER SHEETS

CROSS REFERENCE TO RELATED APPLICATIONS

This application claims the benefit of U.S. Provisional Application No. 63/006,113, filed Apr. 7, 2020 and entitled "Rings, Discs, Shells, and Solid Volumes As Transformer Lenses; With Associated Devices," the entire disclosure of which is hereby incorporated herein by reference.

BACKGROUND

The present disclosure relates to lenses, and their shapes, features, and characteristics, that are capable of transforming an incident laser beam into a laser sheet. Although various laser devices and systems have utilized hollow and like lenses, these conventional lenses do not produce controlled laser sheets.

BRIEF SUMMARY

In accordance with one aspect and various embodiments of the present disclosure, a device is configured to transform an impinging laser beam into a laser sheet. The device includes a lens having an exterior wall and is configured to transform the laser beam into a 2D laser sheet or a 3D laser sheet depending on the alignment of the lens relative to the laser beam. The lens is configured to transform the impinging laser beam into the laser sheet having a fan angle up to and including 360 degrees. The lens may also include a race extending therethrough, such as between an inlet port at an exterior surface of a solid portion of the lens and an outlet port at another exterior surface of the lens or a terminating end within the lens. The lens is configured to allow a portion or a totality of the laser beam through the race, from the inlet port to the outlet port. A lens can include more than one race, a race can be hollow, solid, or a combination thereof, and any race may or may not have an exit port of the lens. Various portions of the lens also may be a dielectric or metallic material, have coatings thereon, and/or include apertures and/or grids and/or gratings on the exterior surface.

The foregoing and other features of the invention are hereinafter described in greater detail with reference to the accompanying drawings.

BRIEF DESCRIPTION OF THE DRAWINGS

FIG. 29A depicts an example toroidal full ring lens with races and ports;

FIG. 29B illustrates internal race circuits and ports of the lens of FIG. 29A;

DETAILED DESCRIPTION OF THE DRAWINGS

Figure 1:
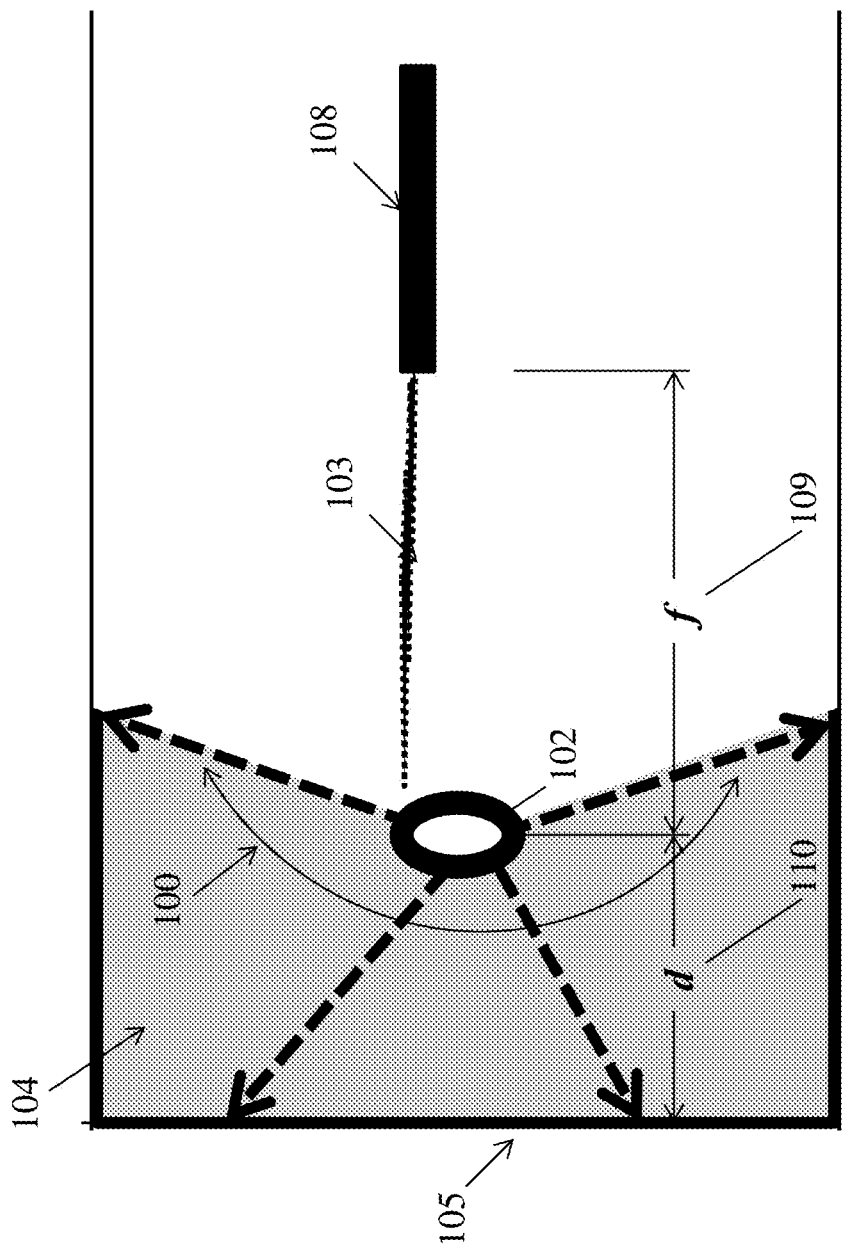
FIG. 1 illustrates a first example 2D laser sheet produced by a lens.

Briefly, the following disclosure relates generally to a set of lens shapes, and more particularly to lens shapes to transform laser beams into laser sheets. The output laser sheet can span both two-dimensional (2D) and three-dimensional (3D) space, where sheets can have a curvature and be projected onto a projection surface in a controlled manner.

This can be accomplished, for example, because the electromagnetic (EM) characteristics of the laser beams can be altered by the lens. For instance, lens shapes can have solid or hollow shaped race features traversing the lens exteriorly and/or interiorly that alter the EM wave of the laser beam as it traverses though the lens, and thus affect the output laser sheet. Similarly, coatings and material layers, lens shapes, and other design features interior and exterior to the lens, can also alter the EM wave of the laser beam and affect the output laser sheet.

For example, a fan angle of a laser sheet can range from angles less than 90 degrees to an upper angle of 360 degrees. The fan angle is determined at least by shapes of lens sections that are simply connected without cavities, simply connected with at least one cavity, and/or multiply connected. Dielectric and metallic layers can also be stacked within the lens. For example, metallic materials can be used for the base material of the lens with dielectric layers stacked thereon, or the metallic material can be layered within a lens having a dielectric material base. The metallic materials can be imperfect, good, and perfect conductors. Any of the layers can be offset from a base material of the lens, such as to form a cavity between the base material and a layer over the base material. The layers can also have different thicknesses from one another. For example, coating designs and layering designs can be uniform or selectively deposited. The coating designs and layering designs can approach thin films.

In use, lenses described herein that can produce laser sheets have many possible uses. For example, the laser sheets can be used to determine range and positioning of objects that have dimensions other than what conventional radar can detect. In these uses, the lens can be mounted on a spindle similar to conventional radar such that transmitted light pulses originating from the lens reflect off of an object and return back towards the source to a receiver/antenna.

In another example use of a laser sheet, a laser sheet transmitter (e.g., a laser and lens that produces a laser sheet) combined with a photon sensor strip and an electronic signal processing unit can be used to detect objects piercing through or along the laser sheet. For instance, electronic sensing planes can be formed along the boundaries of a playing field. If a sporting ball passes through an EM plane (e.g., a laser sheet) an interruption in the circuit would indicate that a ball pierced through—or along—the bounding plane. With signal processing, the ball location and time of the circuit interruption event can be determined. Further, light sensitive nano-fibers or nano-particles can be manufactured into the surface of the object to reflect the laser light with unique identifying characteristics. This would establish a certain reflection characteristic not present with possible natural random occurrences. Similarly, a laser sheet can be designed to hover just over the playing field to detect where and when a ball interrupts the curved 3D laser sheet. This technology can be applied to other sporting events and/or other applications where tracking objects with precision is required.

Similarly, lenses that broadcast laser sheets with 3D curvature can be designed to hover on the boundary of surfaces that are curved or crowned. In these instances again, objects of interest passing through the sheet can be detected. This can also be beneficial when building up or removing material with precision. For example, positioning a transmitter and receiver strip at a predetermined height where an upper (or crowned) surface will be allows the surface to be built up (or removed) until the laser sheet no longer completes a circuit along the receiver strip. At that point, it can be determined that the surface has reached the desired height.

Still further, laser sheets can be used to set compressive thermal stresses into large engineered products that have histories of fatigue failures. Setting compressive surface stresses in regions where fatigue exists requires high powered output to supply the heat. For example, a lens made of quartz may have selectively deposited coating patches, with high temperature capability, on the exterior surface of the lens. This surface feature can promote high power pulsed laser light streams to impinge on a region of an engineered component that requires thermal stress conditioning. Further, hybrid designs utilizing races within a lens can facilitate timed pulse strikes by managing position and wave speed. Such systems could also include cooling heat transfer components (e.g., fans, heatsinks, and the like) for instances in which the heat carried by the laser pulse increases the temperature of the lens beyond a predetermined threshold. High power requirements, for device applications like this, can be made from quartz or can require a pure metallic composition.

As noted above, lens shapes can affect the characteristics of a produced laser sheet. The lenses (and sections of lenses) described herein may take on any suitable shape, including but not limited to, prismatic, ring, disc, plate, shell, or solid volume shapes, where sections of these shapes can be simply connected without cavities, simply connected with at least one cavity, or multiply connected. The lens can also be of one or more materials that permit propagation of EM waves, such as dielectrics, metallics, and composites of both dielectrics and metallics. The surfaces of the lens can be coated or layered, where the coating or layering can be uniform or selectively deposited over the surface area. Apertures, grids, and gratings can be part of these lens designs. The surface area can be conditioned by a plurality of etching techniques. Closed inner cavities can be partially or fully filled with substances such as solids, fluids, gaseous vapors, colloids, or plasmas in order to enhance an electromagnetic wave as it traverses the lens. Race features can be integrated into any lens to control the EM characteristics of the laser sheet produced by the lens. The race features can be solid or hollow, where suitable, and can reside on the lens surface and/or on subsurface of the lens. According to the aforementioned features of the lens, the lens can affect EM characteristics such as wave speed, group velocity, phase velocity, reflection, transmission, refraction, cutoff frequency, amplitude modulation, frequency modulation, attenuation, fan angle, wave width, and/or impedance of any laser beam passing therethrough. These features can also affect transmittance and reflectance of an incident laser beam as it propagates through the lens. In various embodiments, a lens or lens section can include any suitable combination of the aforementioned features.

Embodiments of lenses according to the present disclosure will now be described with reference to the accompanying drawings. Referring first to FIGS. 1-4, these figures depict sketches of a laser source (108, 208, 308 408), a laser beam (103, 203, 303, 403), a lens (102, 202, 302, 402), a corresponding laser sheet (104, 204, 304, 404), a fan angle represented by an arc (100, 200, 300, 400), a projection surface (105, 205, 305, 405), a distance d (110, 210, 310, 410) from the lens (102, 202, 302, 402) to the projection surface (105, 205, 305, 405), and a distance $f$ (109, 209, 309, 409) from the laser source (108, 208, 308 408) to the lens (102, 202, 302, 402).

The output of the laser sheet 104 of FIG. 1 has a fan angle 100 greater than 180 degrees, which can reach up to 360 degrees. In order to achieve such a fan angle, the lens 102 is convex where the laser beam 103 first contacts the lens 102, and has a hollow center cavity. In this configuration the distance d 110 is a distance from the lens 102 to the projection surface 105, and the distance $f$ 109 is a distance from the laser source 108 to the lens 102. In contrast, the fan angle 200 of FIG. 2 extends just over 180 degrees, while the fan angle 300 of FIG. 3 extends just under 180 degrees, and the fan angle 400 of FIG. 4 extends 90 degrees. The projection of FIG. 2 results from the lens 202 being provided at a same distance $f$ 209 as the distance $f$ 109 at FIG. 1, but being generally half of the lens 102 in cross-section. Thus, due to the hollow center cavity, the lens 202 has a convex surface where the laser beam 203 first contacts the lens 202. The projection of FIG. 3 results from the lens 302 being provided at a lesser distance $f$ 309 from the laser source 308 as compared to the distance $f$ 109 of FIG. 1 (and accordingly a greater distance d 210 to the projection surface 205), while having the same shape as the lens 202. The projection of FIG. 4 results from the lens 402 being provided at the same distance $f$ 409 as the distance $f$ 109 at FIG. 1, but having only a quarter of the shape of the lens 102 in cross-section. The projected image length on projection surfaces 105, 205, 305 and 405 can be much greater than the distances d and $f$ shown. Further, increasing the distance d increases the size of the projected laser sheet.

Figure 2:
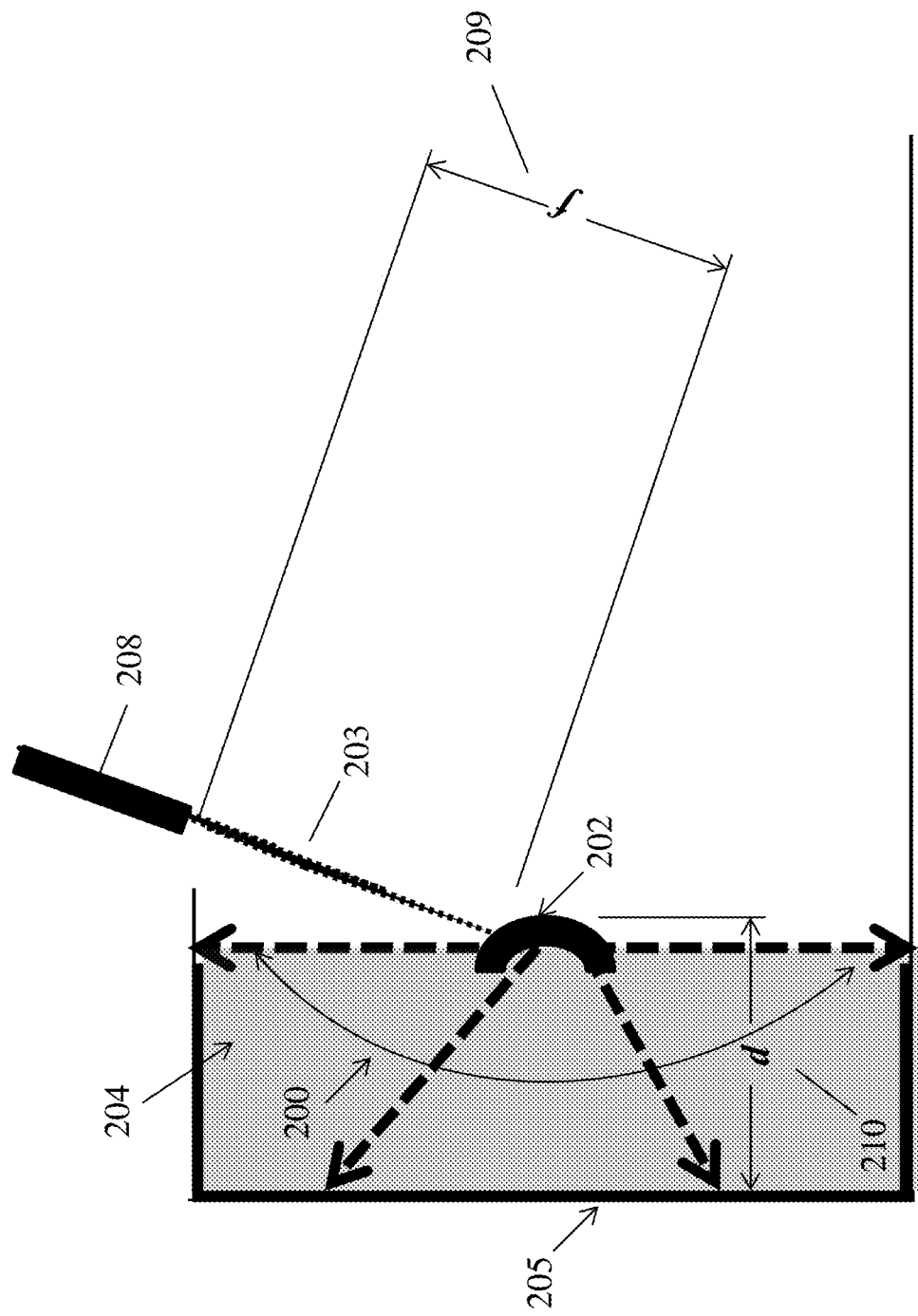
FIG. 2 illustrates a second example 2D laser sheet produced by a lens.
Figure 3:
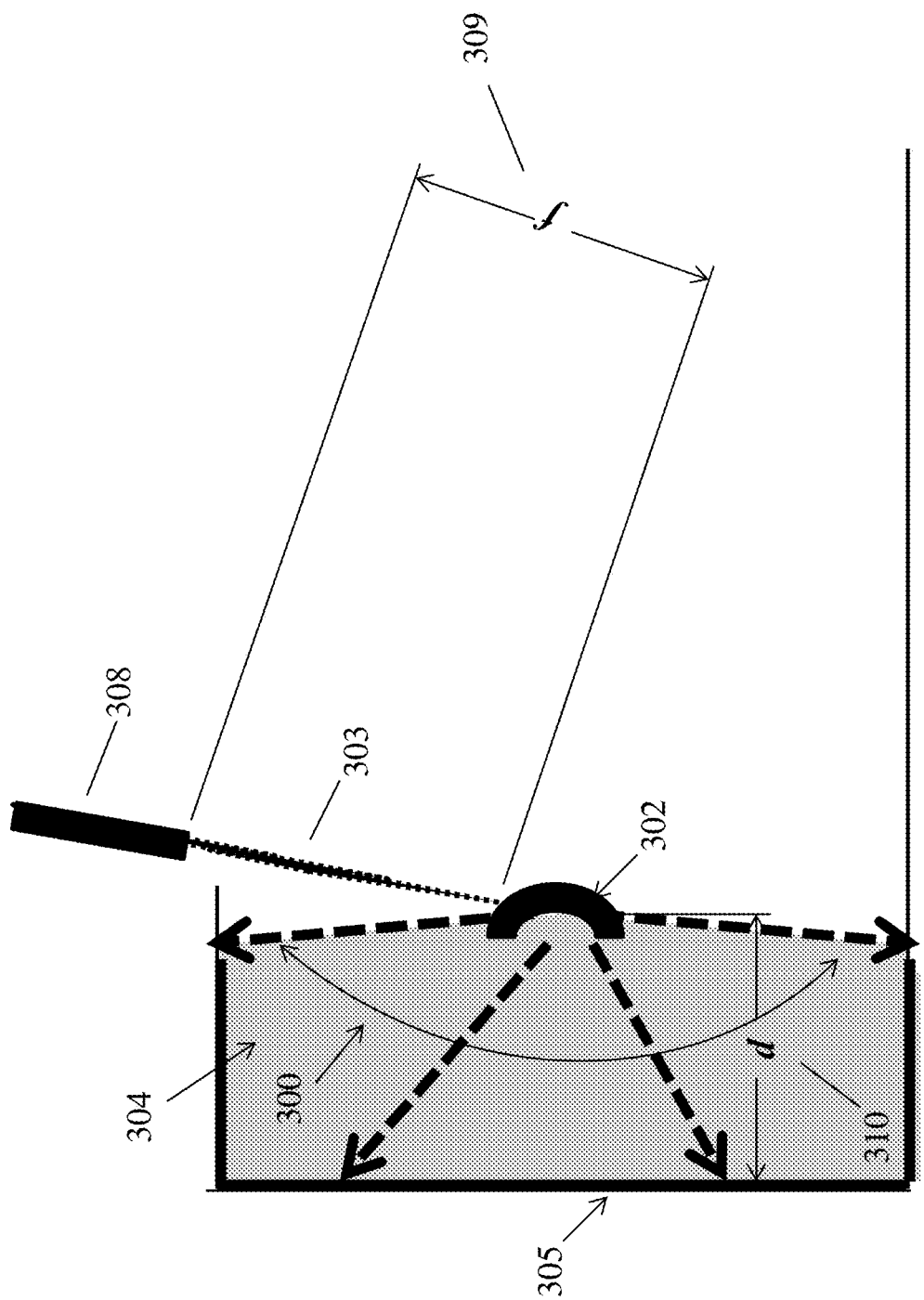
FIG. 3 illustrates a third example 2D laser sheet produced by a lens.
Figure 4:
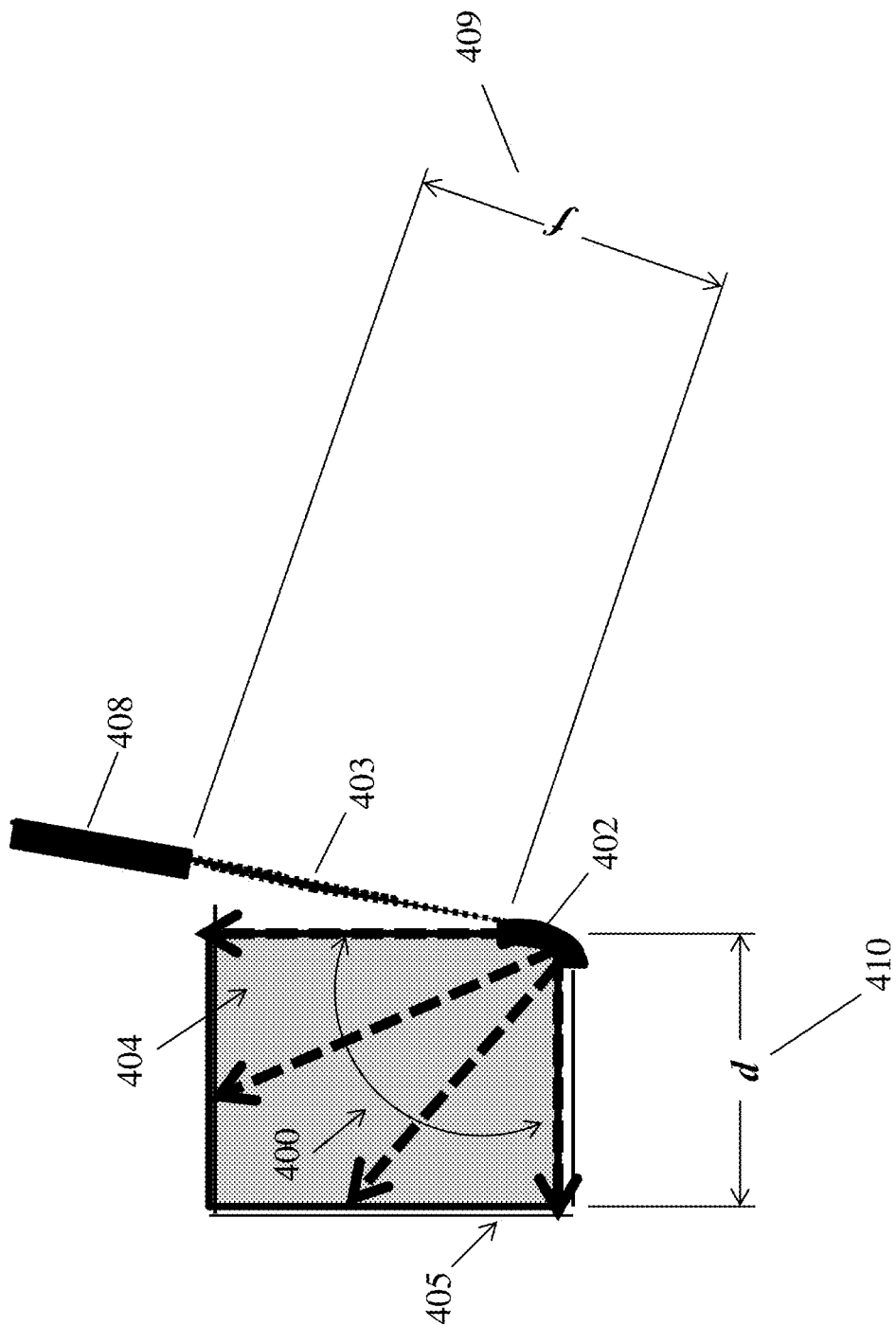
FIG. 4 illustrates a fourth example 2D laser sheet produced by a lens.

The incident angle and strike position at the lens has an influence on how the reflected rays interact with edges of the lens, and thus affects the fan angle. For example, although shown as having a fan angle of 180 degrees, the lens 202 may produce laser sheets having fan angles approaching 270 degrees depending on the incident angle. Further, coatings applied to the lenses can affect the fan angle. For example, an applied coating can generate a laser sheet fan angle just below and above 90 degrees for lens 402, just equal to or above 180 degrees for lens 302, and just above or below 180 degrees for lens 202. Adjusting strike position and incident angle on lens 202, 302, and 402 can also generate output as shown in FIG. 2, FIG. 3, and FIG. 4. Introducing facets, or other edge trimming, on edges 222, 333, and 444 can also control the internal reflections of an incident laser light, and thus the fan angle of an output laser sheet.

More particularly, an incident angle of 90 degrees (normal) into a race of the lens can increase the fan angle, where the fan angle further depends on the geometry of the race. Further, incident angles of 90 degrees (normal) to the lens surface for simply connected sections without cavities, can produce fan angles less than 90 degrees, while a similar incident angle for multiply connected lens sections can produce fan angles up to at least 180 degrees. Further, in view of Snell's law, there is a critical incident angle at which total internal reflection occurs and no leaky refracted light is generated. The effects of strike location and incident angle apply to both 2D and curved 3D laser sheets.

As noted in U.S. Pat. No. 10,422,998, issued on Sep. 24, 2019 and entitled "Laser Transformer Lens," the entirety of which is incorporated herein by reference, the distances d (110, 210, 310, 410) and $f$ (109, 209, 309, 409) are less than the length of the laser output projections extending from a center of the projected laser sheet to an edge of the projected laser sheet. The power level of the laser sources (108, 208, 308, 408) should be sufficient enough to excite the laser output shown. The incident angles of the laser beams striking the lenses (102, 202, 302, 402) are oblique, and the strike location can influence the output of the laser sheet, as noted above. That is, the fan angle of a laser sheet can be adjusted less than or greater than 90 degrees, and even greater than 180 degrees and extending to 360 degrees via the shape of the respective lens and the location and/or angle of the respective strike location thereof by an incident laser beam.

Figure 5:
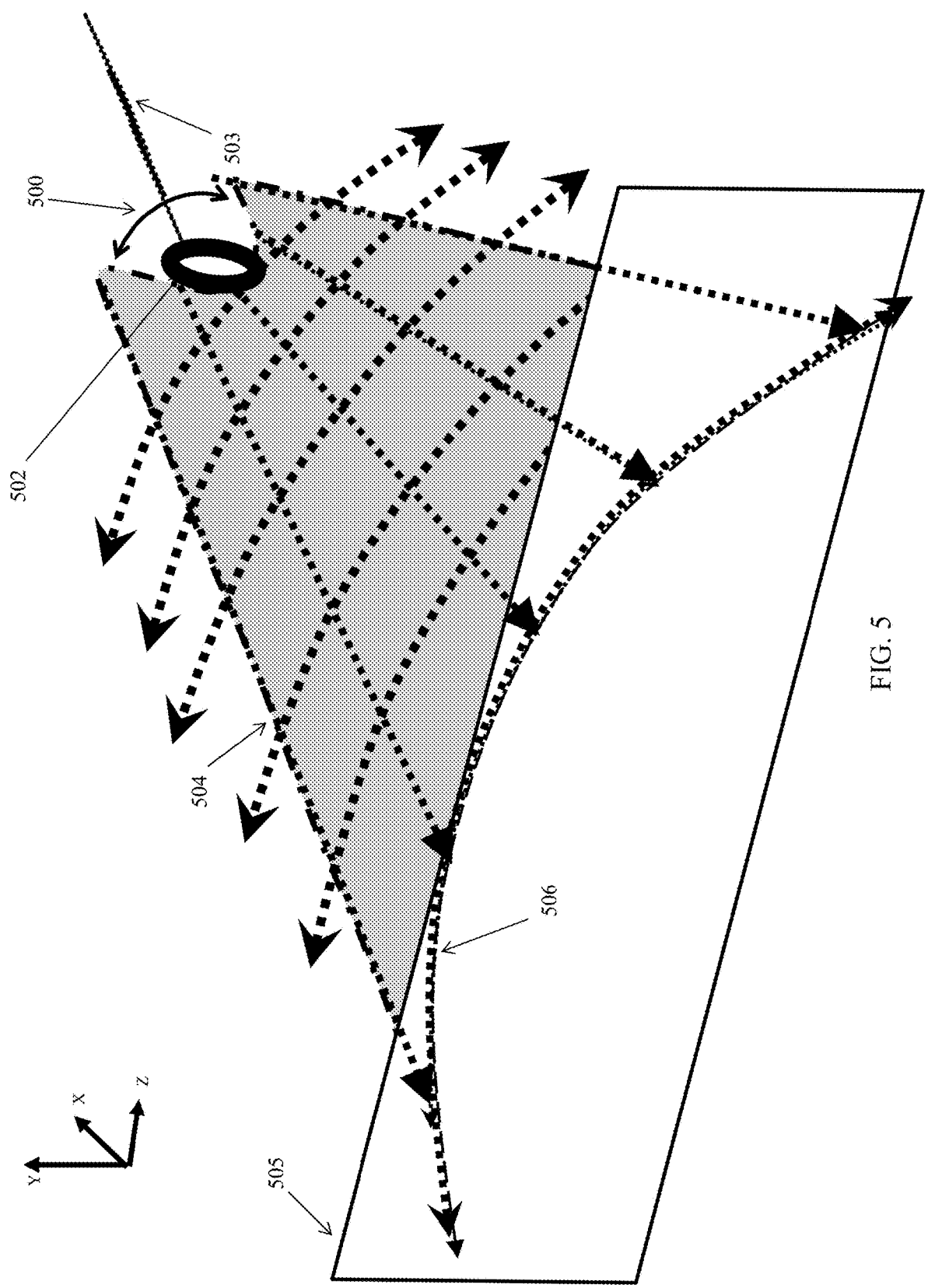
FIG. 5 illustrates an example 3D laser sheet with curvature produced by a lens.

Different from FIGS. 1-4, the lens output shown in FIG. 5 has a curvature. FIG. 5 depicts a perspective sketch illustrating a laser beam 503, a lens 502, 3D laser sheet 504, projection surface 505, and a 3D laser curve 506. The laser source is not shown. As seen in the figure, the beam 503 strikes the lens 502 at a skewed angle. The output laser sheet 504 has a fan angle 500 greater than zero degrees and extending over 180 degrees up to 360 degrees. Also not shown are the distances d and $f$, however, similar observations for the planar configurations stated above hold for the 3D configuration. As can be seen in the figure, the laser sheet 504 strikes the projection surface 505 with a projected image 506 that has curvature.

According to Snell's law, as the index of refraction increases for a material, the velocity of light passing through the material decreases. Also, as a light ray passes from a low index material to a high index material, the refracted light ray changes directions tending toward the normal direction. Conversely, as a light ray passes from a high index material to a low index material, the ray changes directions tending away from the normal direction. In view of this, lens materials having different indices of refraction can be stacked in a manner to control direction, wave speed, phase velocity, the amount of reflected and transmitted light, and/or impedance of an incident light ray, thereby affecting an output laser sheet.

The light ray mechanics of the present disclosure can be described by the generalized embodiments of lens sections sketched in FIG. 6 through FIG. 11. The ensuing embodiments demonstrate that lens shape and surface condition can influence the output of lenses. The embodiments in FIGS. 7 to 10 generally correspond to the 2D planar output shown in FIGS. 1 to 4, whereas FIG. 11 corresponds to the 3D output with curvature in FIG. 5. The lens sections sketched in FIG. 6 through FIG. 11 are meant to be generalized representations of lens sections that can be designed into practical lens shapes that are simply connected without cavities, simply connected with at least one cavity, and/or multiply connected sections with at least one cavity, respectively. In general, the curves defining the section boundaries (inner and exterior) can be one or more of curves, piecemeal combinations of different curves, curves and straight lines, or straight lines, and may form any known shape (such as circles, triangles, rectangle, and the like) or be an arbitrary shape. Additionally, rings, discs, plates, shells, prisms and other solid volume shapes of lenses and lens sections produce leaky light output—the refracted light output exiting the lens exterior—which forms the laser sheet. Both 2D laser sheets and 3D laser sheets with curvature are produced, provided that enough power is available to generate the leaky light, that the preferred location and incident angle is used to strike the lens surface, and where applicable, coatings are applied.

The incident light rays (from FIGS. 6, 7, 8, 9, 10, and 11) refract within the lens interior and the initial refracted ray can reflect between the lens boundaries making a reflective wave train. For certain strike location, incident angle, and laser source power level, the reflected wave train (shown by the double stemmed arrows) can refract leaky laser light outward along the lens exterior. The leaky laser light can propagate around an entire lens section—or the leaky laser light can propagate outward from the entire lens (ring and shell configurations)—depending on the orientation of the laser beam relative to the lens section. For some lenses, both 2D and curved 3D sheets can be generated depending on incident angle, strike location, and power level. This leaky laser light generates the laser sheet.

For practical shaped lens sections, a characteristic length—or characteristic radius (a lens section area divided by the lens section perimeter)—had an influence on the lens output for a given laser beam diameter and power level. As the characteristic radius increased compared to a given laser beam diameter, the power level of the laser source had to increase to achieve the same output as a lens with a smaller characteristic radius. Hence, for a given characteristic radius, the laser power, beam diameter, strike location, and incident angle can be adjusted to control the leaky light output. Similarly, characteristic radii were found for simply connected sections with one or more cavities and for multiply connected sections. From a power perspective, the characteristic radii can control laser light source power requirements.

Figure 6:
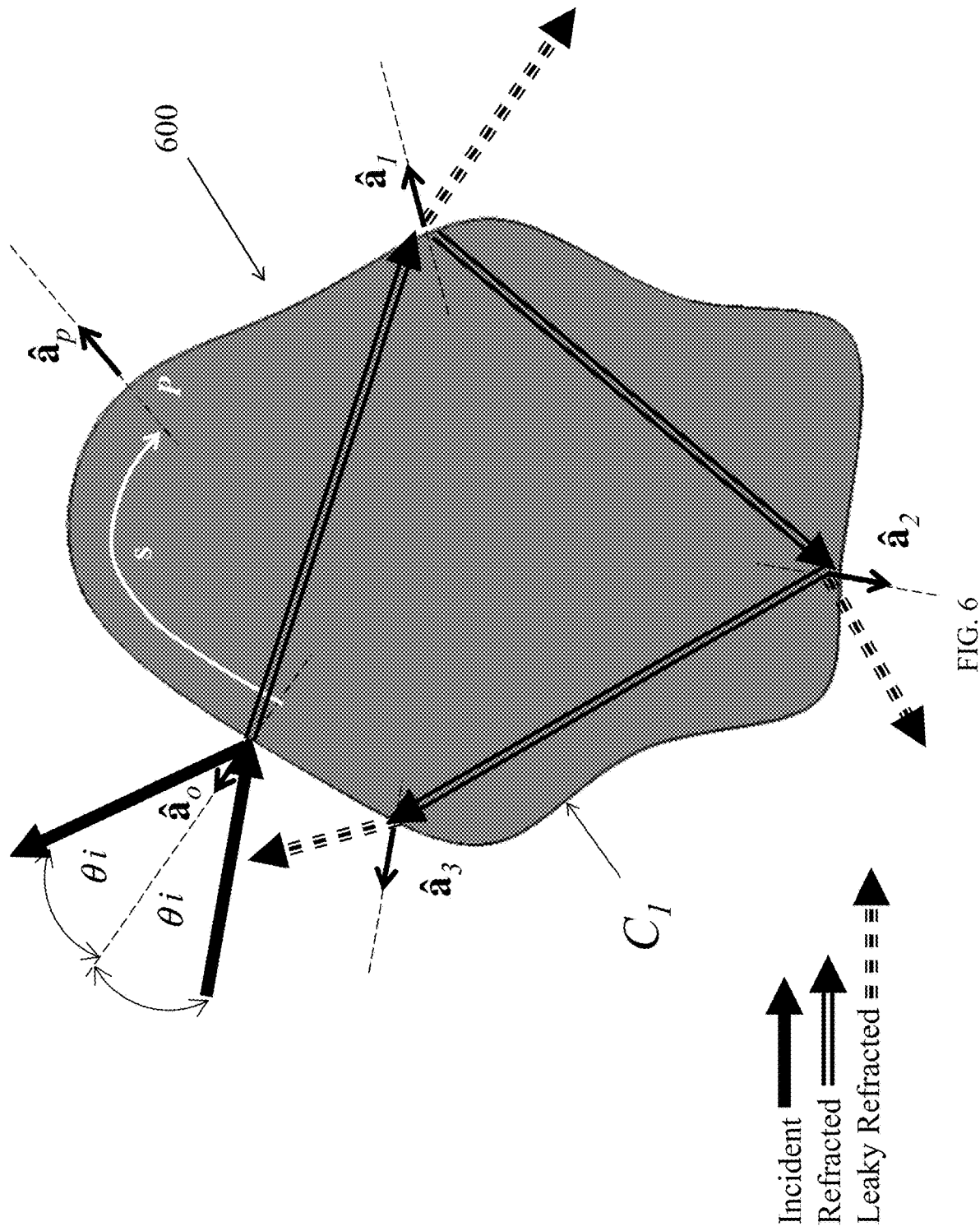
FIG. 6 illustrates an example simply connected section of a lens.

FIG. 6 depicts a simply connected lens section 600 without cavities, bounded by a continuous curve $C_1$. In the example of FIG. 6, the lens section is free from surface conditioning effects and the lens section is co-aligned in the same (or nearly the same) plane as the incident laser beam. The incident light ray is shown as a solid vector at an incident angle $\Theta_i$ with respect to the normal direction defined by the unit normal $\hat{a}_o$. A material locating curve, s, is shown that starts from the unit normal at the incident location and can stop at any material point along the surface. The refracted rays for the first three refraction events of the incident light are shown as double stemmed vectors where the $1^{st}$, $2^{nd}$ and $3^{rd}$ generation refracted rays are excited. Normal vectors $\hat{a}_1$, $\hat{a}_2$, $\hat{a}_3$ are shown at the refraction event locations. As sketched, the medium propagating the incident ray within the section boundary curve $C_1$ has a lower index of refraction than the lens index, as the refracted wave is oriented towards the respective normal directions shown at the incident location. Accordingly, the refracted light passing through the lens exterior—the leaky refracted light—exits the lens such that the rays are oriented away from the respective normal directions as would be expected for a lens with a refraction index higher than that of the interface material. Also shown in FIG. 6 is an arbitrary point P with a normal direction $\hat{a}_P$ located a distance s from the incident location. By adjusting at least the incident angle and power level of the laser source, any point P can produce a leaky refracted light ray for this section.

Figure 7:
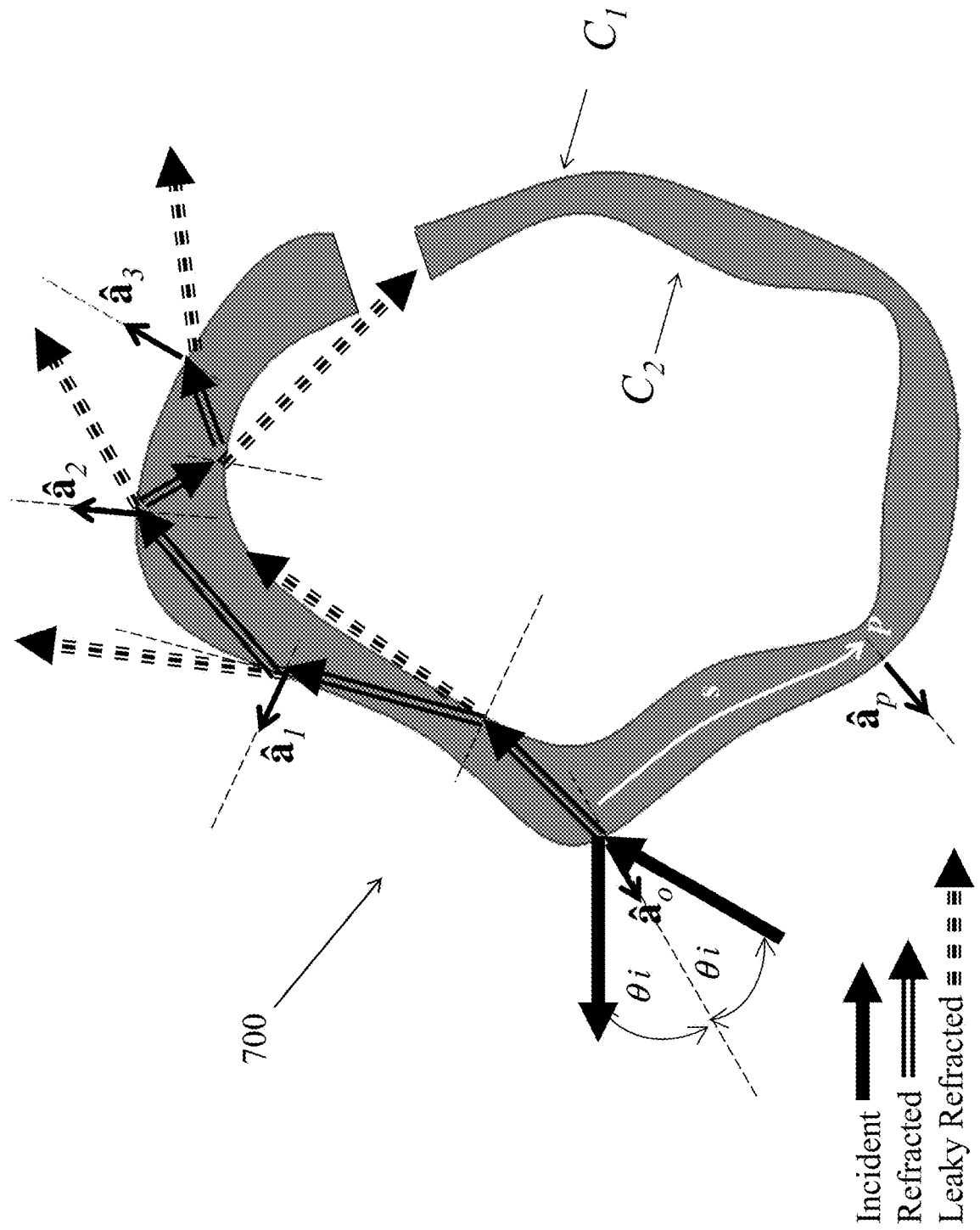
FIG. 7 illustrates another example simply connected section of a lens.

Similar to FIG. 6, FIG. 7 illustrates the ray trace for a simply connected section 700 with a cavity, the outer lens shape being bounded by curve $C_1$ and the cavity shape being bounded by curve $C_2$. Again in the example of FIG. 7, the curves $C_1$ and $C_2$, are without surface effects (e.g., reflective coatings), similar to the lens of FIG. 6. Where possible, the refraction index of the section is shown higher than the medium which the incident ray propagates through, as is implied by the refraction angles sketched where refraction events occur. Normal vectors $\hat{a}_0$, $\hat{a}_1$, $\hat{a}_2$, $\hat{a}_3$ are shown at the refraction event locations where the leaky refracted rays exit the lens on boundary $C_1$. The section is co-aligned with the same (or nearly the same) plane as the incident laser beam. Again, by adjusting at least the incident angle and power level of the laser source, any point P along s can produce a leaky refracted light ray. The light rays contributing to the leaky light refraction are excited primarily by the light rays traversing the lens material.

Figure 8:
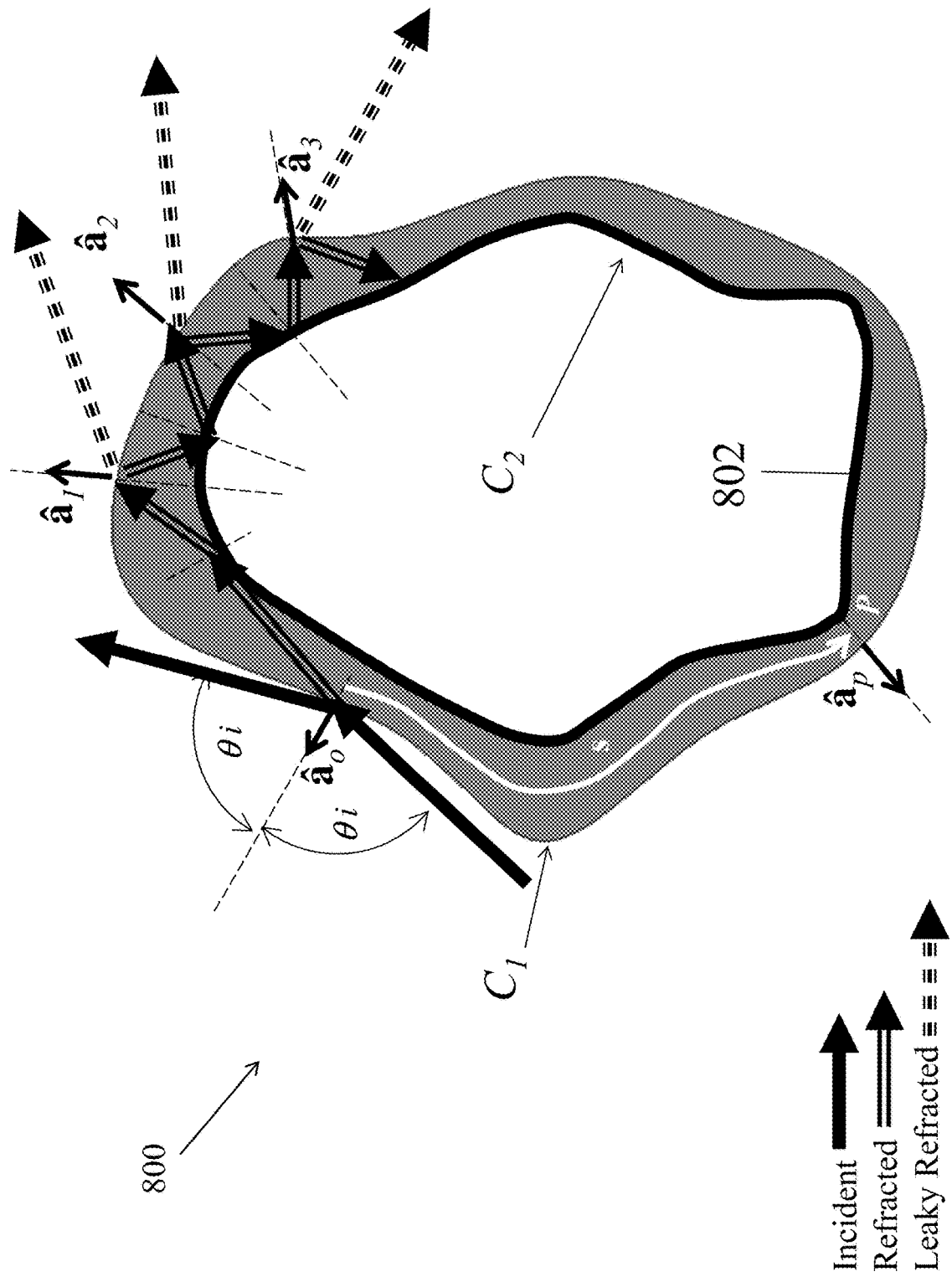
FIG. 8 illustrates yet another example multiply connected section of a lens.

Similar to FIGS. 6 and 7, FIG. 8 illustrates the ray trace for a multiply connected section 800, having an outer shape bounded by curve $C_1$ and in inner cavity shape bounded by curve $C_2$. In this example, curve $C_1$ is without surface effects while $C_2$ is completely coated with a reflective coating 802. In this configuration, the refraction index of the lens material is higher than the medium which the incident ray propagates through, as is implied by the refraction angles sketched where refraction events occur. Normal vectors $\hat{a}_0$, $\hat{a}_1$, $\hat{a}_2$, $\hat{a}_3$ are shown at the refraction event locations where the leaky refracted rays exit the lens on boundary $C_1$. As seen in FIG. 8, the reflective coating 802 along boundary $C_2$ prevents leaky refracted rays from exiting into the cavity of the lens section, in contrast to the lens section of FIG. 7. The section is co-aligned with the same (or nearly the same) plane as the incident laser beam. Again, by adjusting at least the incident angle and power level of the laser source, any point P along s from the incident location with normal vector $\hat{a}_P$ can produce a leaky refracted light ray.

Figure 9:
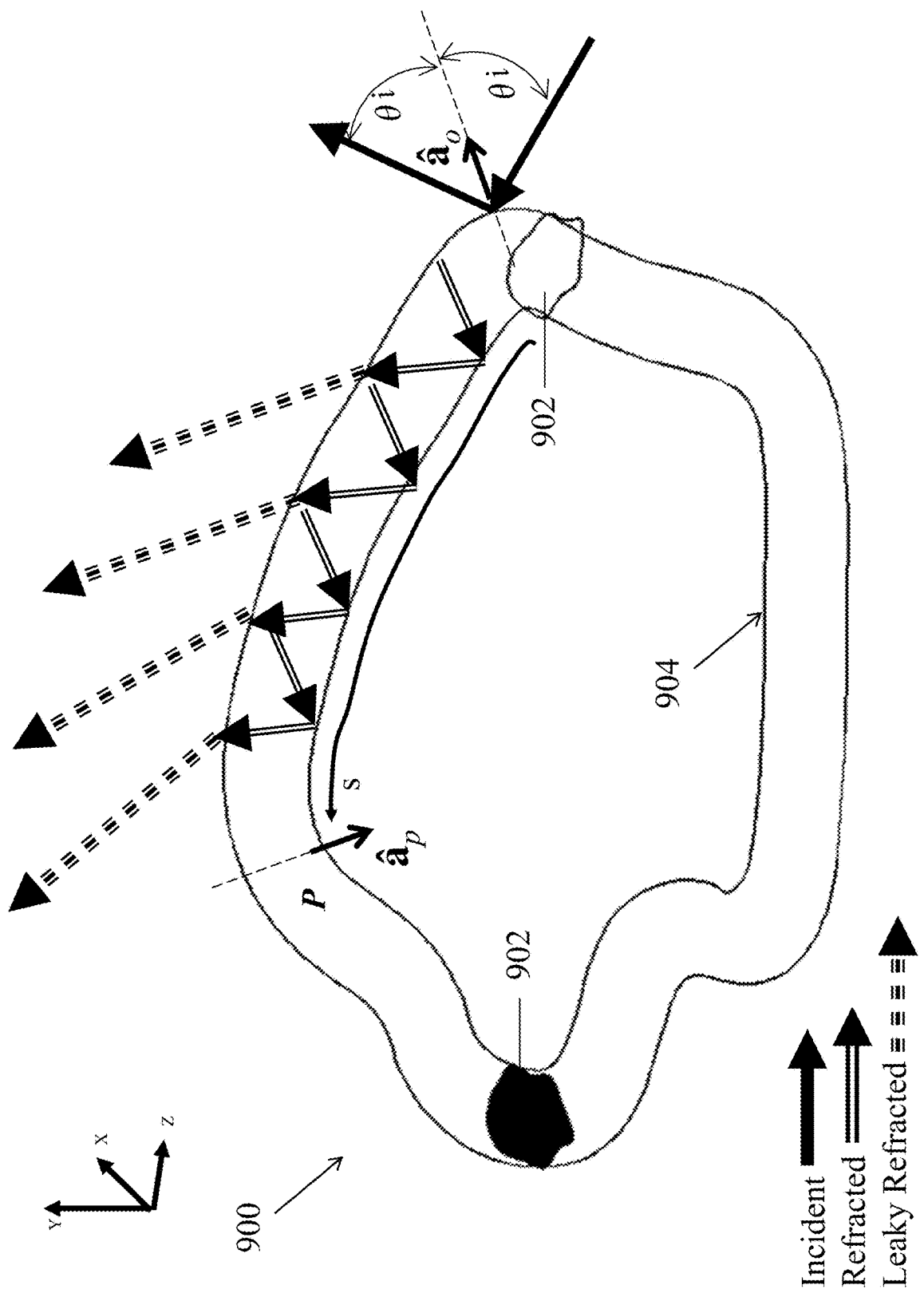
FIG. 9 illustrates an example ring shaped lens.

FIG. 9 illustrates a generalized ring-shaped lens 900 with an irregular tangential path s and simply connected section 902 without cavities. Both the section and the path which the section is swept about to create the lens are generalized shapes. The inboard region of the ring 904, defining an orifice through the ring, is coated with a reflective coating. The incident ray is shown as a solid vector striking the lens at a location with a unit normal $\hat{a}_o$. The incident angle is such that a planar output is excited in the x-z plane, which is perpendicular to the plane x-y of the section. A train of reflected light rays, dwelling in the x-z plane, are also sketched. A point P, having distance s from the incident location, with normal vector $\hat{a}_P$ can produce a leaky refracted light ray provided there is sufficient power coming from the laser source and sufficient incident angle, at least. The battery of reflected rays are shown along with the leaky refracted rays that form the laser sheet output. The reflective coating eliminates leaky laser light from propagating towards the lens center so that maximum leaky light is directed outward from the lens center. Similar to the characteristic radii referred to earlier, rings also have a characteristic length that indicates a power level demand for generating laser sheets with various fan angles. This length is found by the ratio of the illuminated area that the light path sweeps out (internal to the lens) by the reflective wave train divided by the perimeter of the area along s. Similar length observation can be found for shell shaped lenses too.

Figure 10:
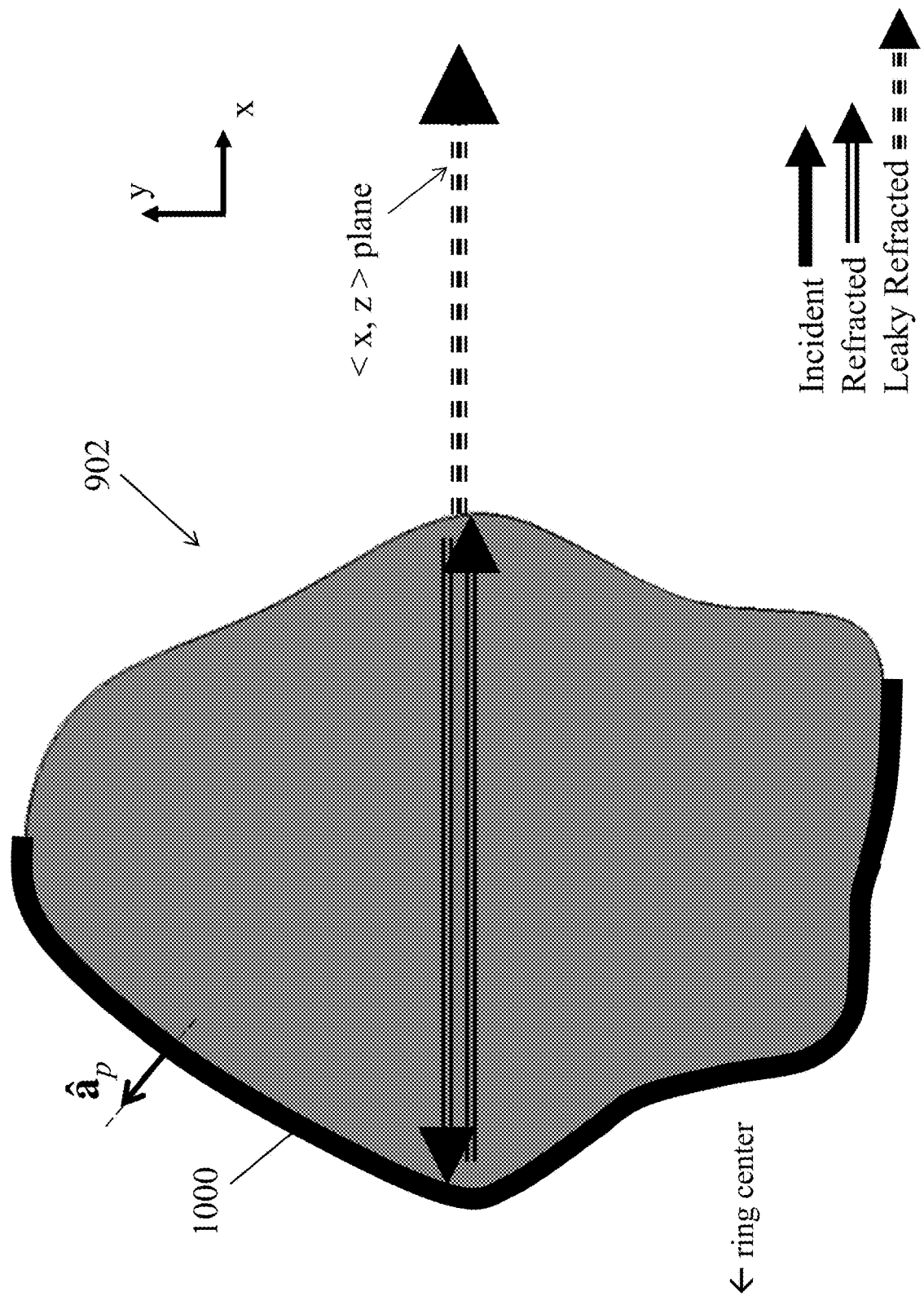
FIG. 10 illustrates an example simply connected section of a lens with coating.

FIG. 10 shows a section 902 of the ring shaped lens sketched from FIG. 10, where the inboard region is covered with the reflective coating 1000. The reflective coating 1000 eliminates secondary light effects referred to in the discussion of FIG. 7, where in this instance, secondary lighting effects refer to the lens ring and not the lens section. The internal light rays are shown sketched in the x-z plane relative to the x-y axes. A leaky refracted light ray is also shown collinear with the x-z plane. The normal vector $\hat{a}_P$ at the arbitrary point P along s is included for reference to the inboard region as a portion of the exterior surface which has a radial component of the normal vector, for a given section, pointing toward the ring center.

Figure 11:
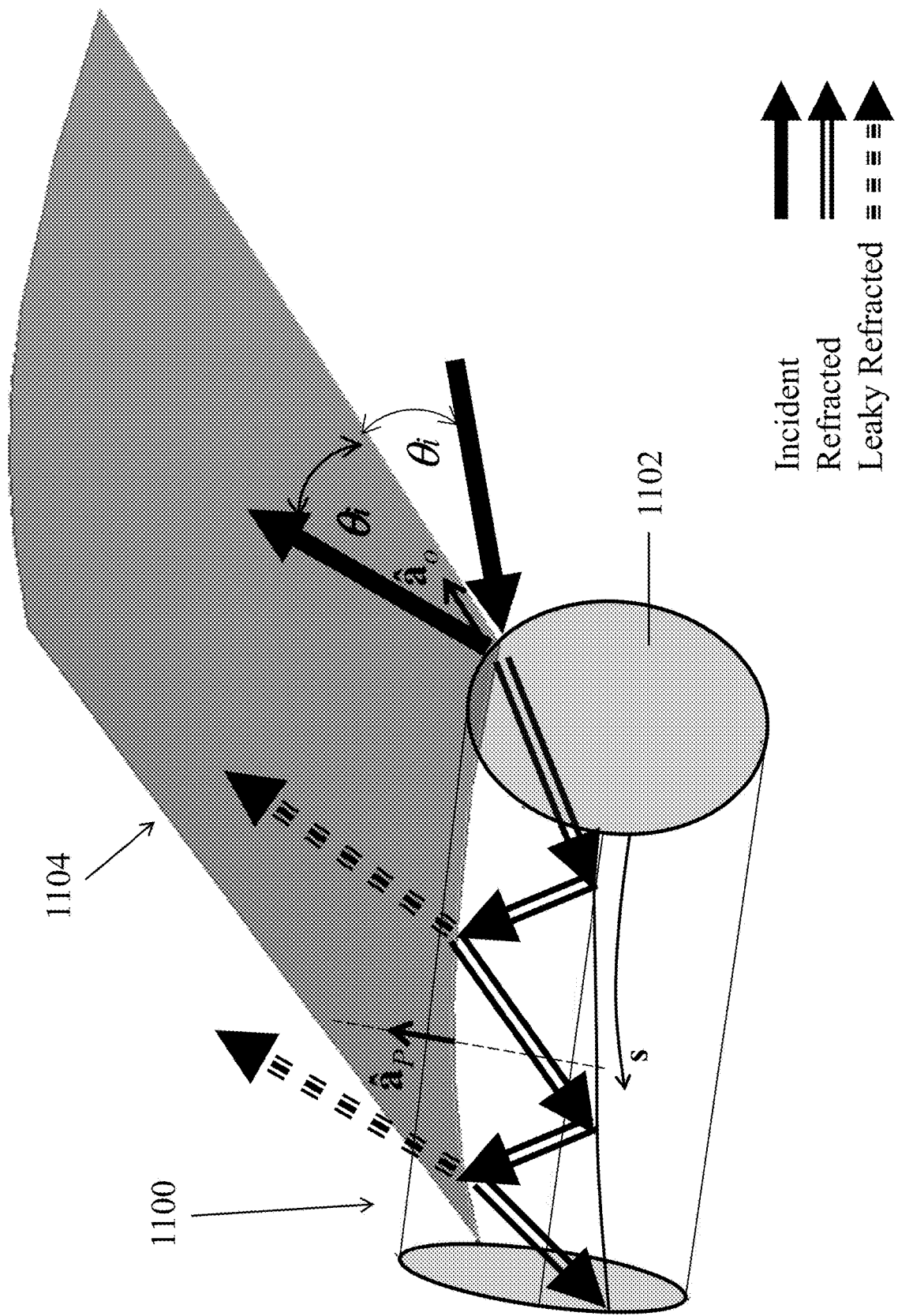
FIG. 11 illustrates an example laser sheet produced by a lens sector.

FIG. 11 depicts a lens segment 1100 from a generalized ring with a tangential path similar to that shown in FIG. 9. The lens section 1102, of the lens segment 1100, is a simply connected circular shape where the inboard surface region is coated similar to that shown in FIG. 10. The incident ray is shown as a solid vector at the incident angle shown, and oriented relative to the lens surface such that the lens emits leaky laser light in the form of a 3D curved sheet 1104. The normal vector $\hat{a}_o$, at the incident location is also shown. A battery of reflected light rays is illustrated with the leaky light rays forming the curved light sheet 1104. In this configuration, the train of reflected rays internal to the lens is not parallel to the section 1102 and is not perpendicular to the section 1102—the rays travel along a surface path that is oblique to the section 1102. The curved light sheet 1104 is output due to this incident angle and assumed power level and path of travel within the lens section 1102, and the shapes of the section 1102 and segment 1100. This 3D curved output can be generated not only by rings as shown, but also lenses shaped as shells, prismatic shapes and other solid volumes. Impingement angle, characteristic radius, and power level control at least the degree of fan angle output for laser sheets in general.

Figure 12:
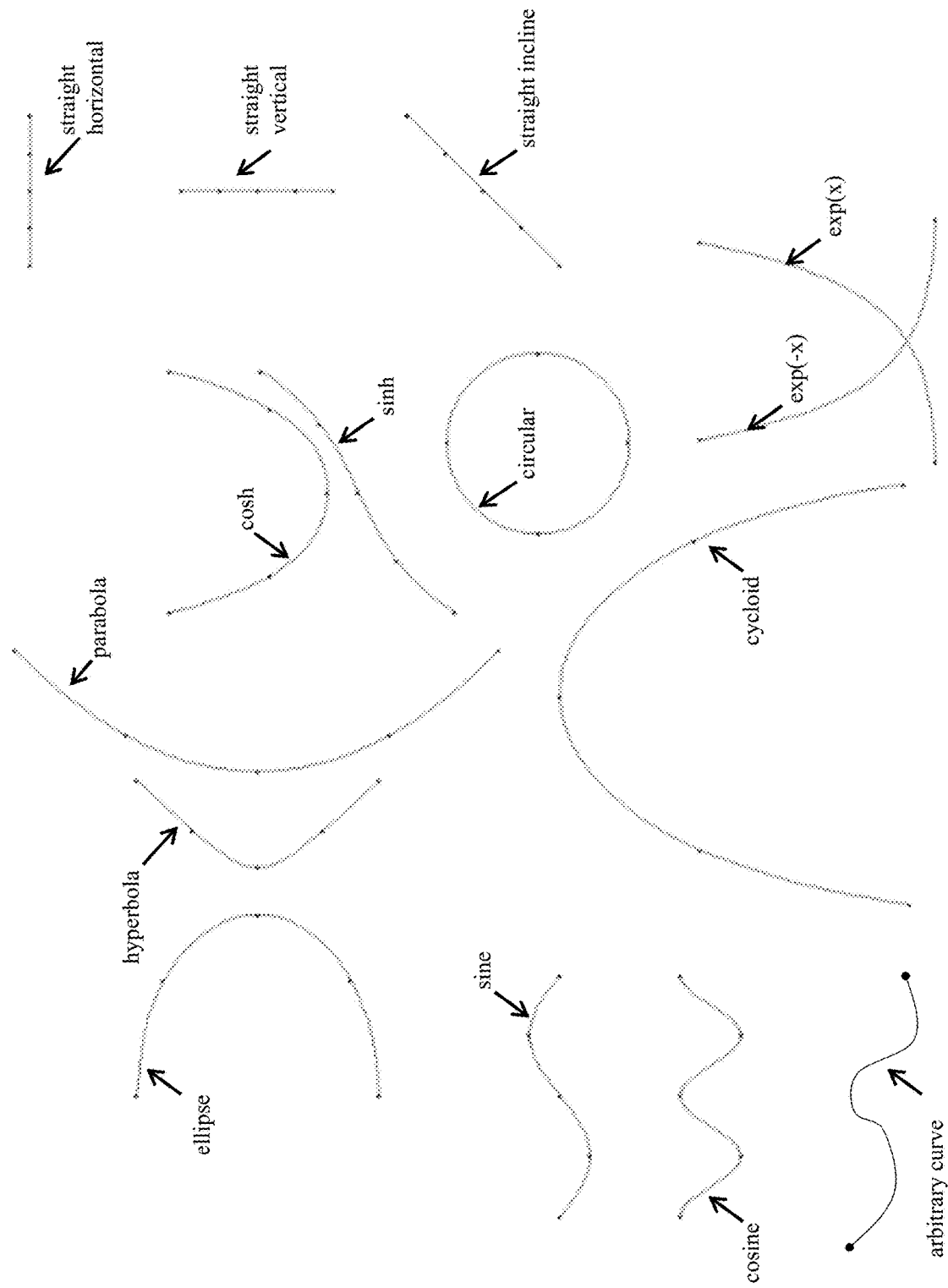
FIG. 12 illustrates a plurality of curve types from which lens sections may be shaped.

FIG. 12 illustrates fifteen (15) different example curves that can be used to form sections of lenses according to the present disclosure. Nearly all of these curves can be represented by infinite power series. These include at least, but are not limited to, the circle, ellipse, hyperbola, and parabola (conic sections), sinh and cosh (hyperbolic functions constructed from the exponential function), sine and cosine (harmonic functions), straight line curves oriented along the horizontal, vertical, and incline, an arbitrary curve, a cycloid curve (e.g., the solution to the Brachistochrone problem), and/or a parametric cycloid (which can be represented by a polynomial). Inverse functions such as logarithmic, arcsine, arccosine, arcsinh, and the like, may also define section shapes. Further, any linear algebraic operation can be performed on these functions to obtain variant forms. These linear operations can be addition, subtraction, multiplication, and or division, and the curves are recognized to satisfy Abelian group operations in the commutative sense. These operations can be performed onto one or more functions. For example, for a sine function $f1$, $1/f1$ generates the cosecant function. Similarly, if for a cosine function $f2$, $f1/f2$ generates the tangent function. And for an exponential function $f3$, then $f1 \times f3$ would be a harmonic function higher order to both $f1$ and $f3$ individually. Furthermore, the linear horizontal line can be interpreted as a curve with constant, c, where $1/c$ or c can be used to shrink or expand each function, respectively. For example, for c equal to ½, multiplying the straight curve into the sum of $\exp(x)+\exp(-x)$ would return the catenary curve. For c equal to 2, dividing the straight line into the difference of $\exp(x)-\exp(-x)$ would return the hyperbolic sine curve. Another example of how linear operations can be performed with these curves is with the sine and cosine curves. If the argument of both functions is the same, the sum of the squares of these functions generate the straight horizontal curve. These primitive functions can also be approximated numerically by the Bernstein polynomials, Basis splines, and non-uniform rational Basis splines (NURBS), which are used in most contemporary analytical engineering programs.

FIGS. 13 to 16 illustrate a laser sheet output radiating from lenses of similar shapes, where the lenses form shapes between an inner surface $S_1$ and an outer surface $S_2$. Each surface $S_1$ is coated with a reflective coating. A material position curve s having an arbitrary unit normal vector $\hat{a}_P$ is shown, where $\hat{a}_P$ is located anywhere along curve s. For all cases the power level, incident strike location, and laser beam incident angle is assumed to be such that the output shown can be produced. Two coordinate systems are provided for reference in the figures: a first in the $\zeta, \eta, \lambda$ space, and a second in the x, y, z space. The $\zeta, \eta, \lambda$ system tracks the lens section orientation while the x, y, z space tracks the laser beam orientation. These systems emphasize that each figure has at least two possible configurations capable of generating 2D laser sheets. The first case corresponds to lens orientations where the lens section shares the same plane as the laser beam such that $\zeta=x$ and $\eta=y$. The second case corresponds to lens orientations where the lens section is in the $\zeta=z$ and $\eta=y$ plane—perpendicular to the x-y plane of the laser beam. In other words, for the first case, the laser beam and the lens section share the same plane of the laser sheet output, whereas for the second case, the plane of the lens section is perpendicular to the plane spanned by the laser sheet. The lens shapes used are uniform, with material removed sequentially to capture the different lens output as the material is removed. Other shapes could also be used to demonstrate the effect, however, using these shapes showed how derivatives of a single shape produces different controlled outputs.

For the first case, the lens section resides in the $\zeta$-$\eta$ plane and radiates a 2D laser sheet in the $\zeta$-$\eta$ plane while the laser beam is in the x-y plane. As shown in FIGS. 13 to 16, the fan angle output is 360, 270, 180, and 90 degrees, respectively, provided that the laser beam has sufficient power level, incident angle, and strike location. The $\zeta$-$\eta$ plane shares the lens section and the x-y plane of the laser beam. The normal vector $\hat{a}_P$ could slide to any point P along the exterior of the lens. For FIGS. 13 to 16, $\hat{a}_P$ could slide tangentially over 360, 270, 180, and 90 degree tangential sweeps, respectively, thereby allowing the leaky laser light to form a laser sheet over the tangential ranges above. Prismatic lens configurations are an example that has this section orientation.

The second case applied to rings and shells where a $\zeta$-$\eta$ plane passes through a lens formed into a full ring or full shell (FIG. 13), and sectors thereof (FIGS. 14 to 16), while the laser beam is in the plane defined by the x-y coordinates. The lens section is in the $\zeta$-$\lambda$ plane, where the section is swept about a revolution axis in a direction along $\eta$ (the axis of revolution being parallel to $\lambda$, and $\eta$ being the direction that the section is swept about) with a constant radius. For sufficient power level, incident angle, and strike location, this configuration radiates a 2D laser sheet with a fan angle of 360, 270, 180, and 90 degree outputs, corresponding to the lenses shown in FIGS. 13 to 16, respectively.

For both the first and second cases, the common elements of these configurations are an inner and outer wall for the reflective wave train to interact with, a reflective coating on the inboard region, and a medium for the wave to traverse through. The normal vector $\hat{a}_P$ can be positioned at any lighted point along the exterior over a 360, 270, 180, and 90 degree tangential sweep for FIG. 13 through FIG. 16, respectively. Provided leaky light rays pass through all of the points at any $\hat{a}_P$, a laser sheet would be launched as shown. The initial and terminating points—and all points in between—that $\hat{a}_P$ can be located at, govern the fan angle of the light output. For example, if the lens surface $S_2$ in FIG. 13 is coated with a reflective coating (r=1) over a lit portion of $S_2$ then the leaky light rays cannot pass thru the coated region hence reducing the full at least 360 degree fan angle to that of a lesser fan angle.

By orienting the laser beam in a plane that is oblique to the x-y, x-z, and y-z planes, 2D laser sheets and 3D laser sheets can be excited. The shape of the bounding surfaces $S_n$, characteristic radius, power level, incident angle, and the strike position of practical lens configurations determine the shape of the leaky light output. For all lens configurations, a limiting value of the incident angle would be that angle which promotes total internal reflection, where no refracted light leaks out from the lens surface.

Figure 33:
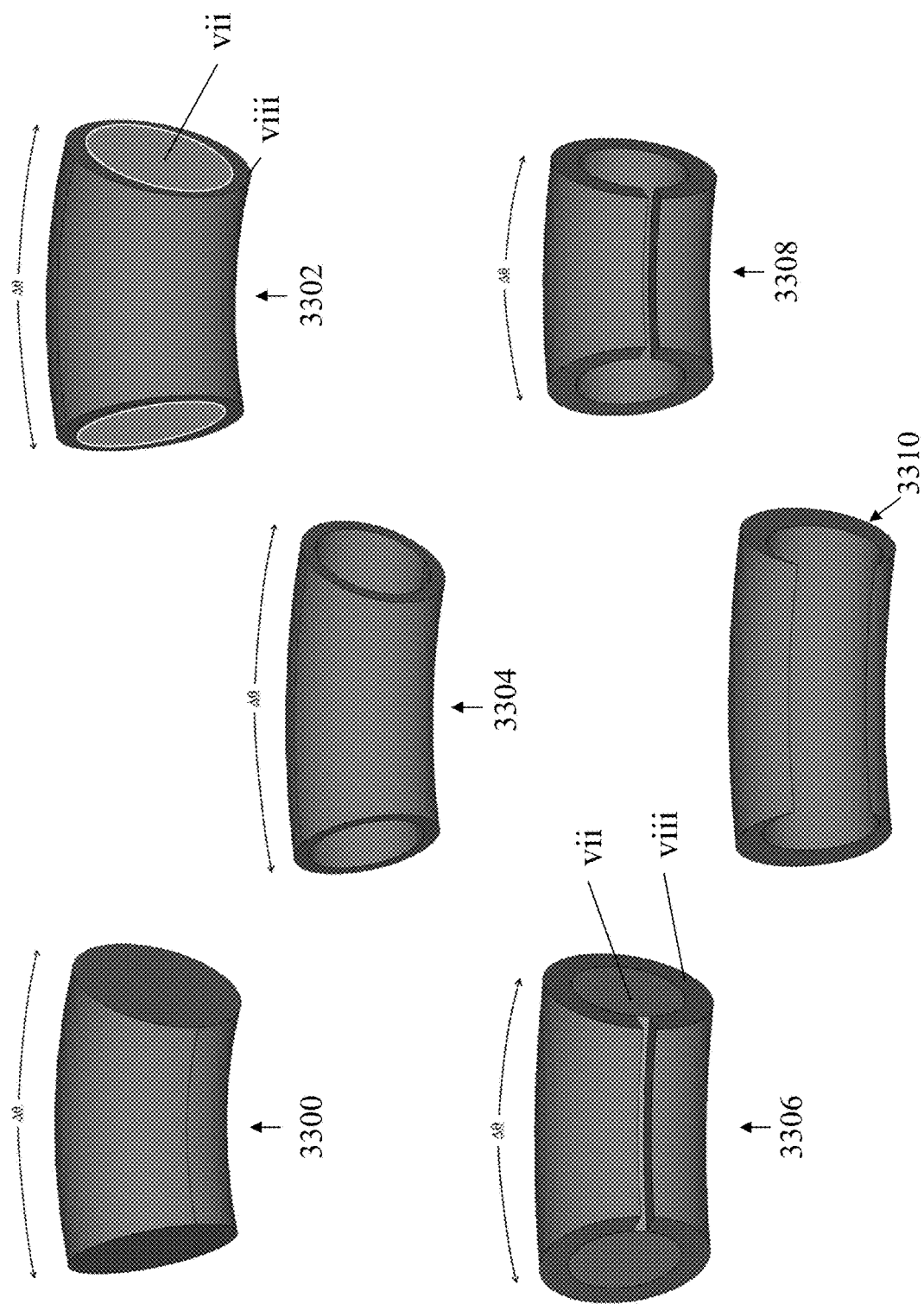
FIG. 33 depicts a plurality of ring sectors.

For both the first and second cases, the lenses are closed volumes bounded by surfaces $S_1$ and $S_2$, and it is the bounding surfaces that propagate the reflected light rays. In the limit, it is possible to construct lenses with hyper-thin walls (e.g., such as the thickness of foil, about 50 mils or less) that approximate surfaces where a collection of such surfaces $S_1, S_2, \ldots S_n$, which form a closed or open chute, could be aligned so that the reflective wave train produces the desired leaky refracted light ray output. This configuration would approach that of hyper-thin shells and dielectric coatings similar to the Dupin shells of FIG. 25 (discussed below). A single hyper-thin shell can have two surface sides to generate a reflective wave train that produces the leaky refracted light. Hyper-thin shells can also be enveloped to generate a reflective wave train that produces the leaky refracted light. In some embodiments, wall thickness of a lens may be non-uniform. For example, as shown at FIG. 33, the wall thickness of lens 3310 is tapered to form a slot (or chute) through the lens.

Figure 13:
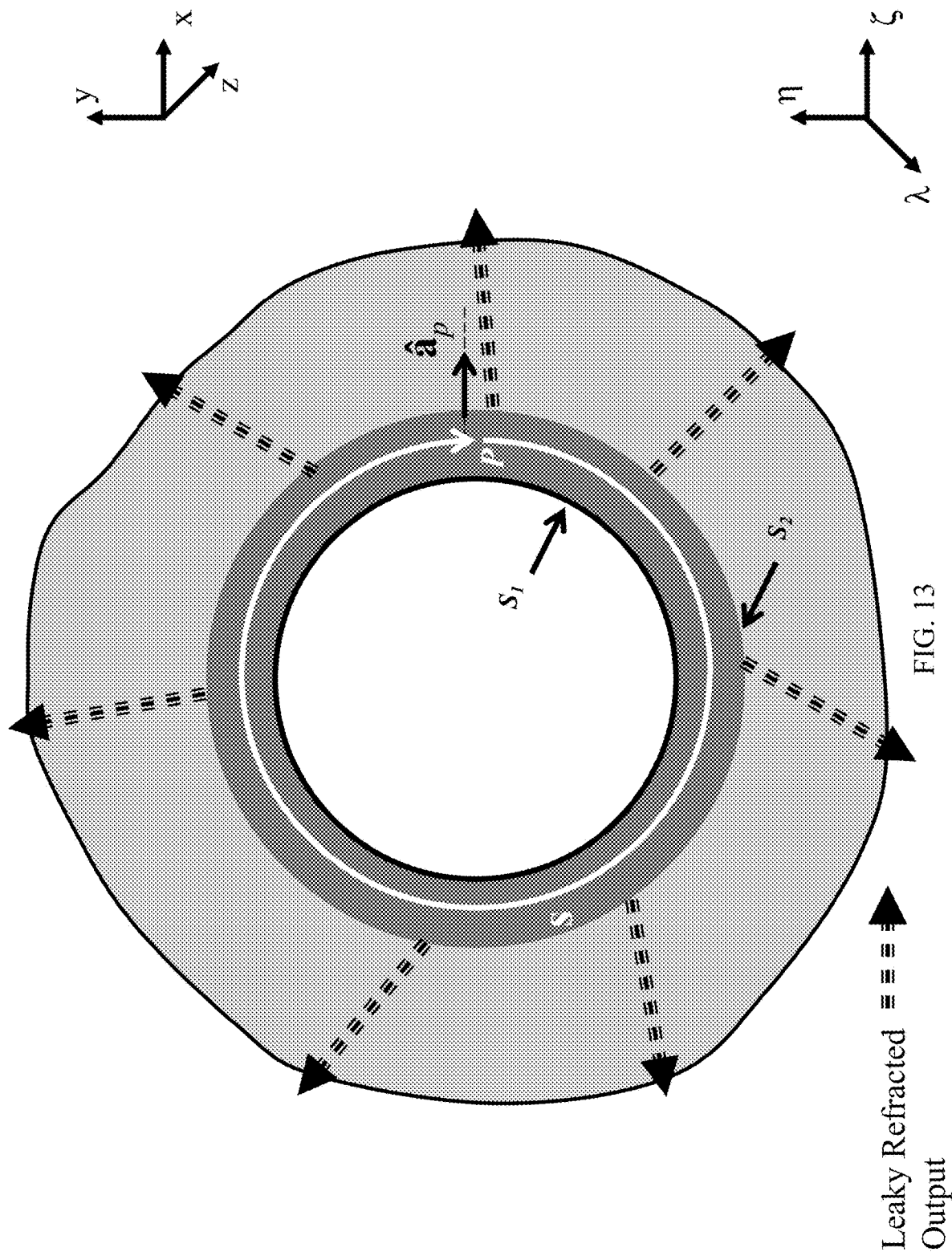
FIG. 13 illustrates an example laser sheet output and laser sheet orientation outcome.
Figure 14:
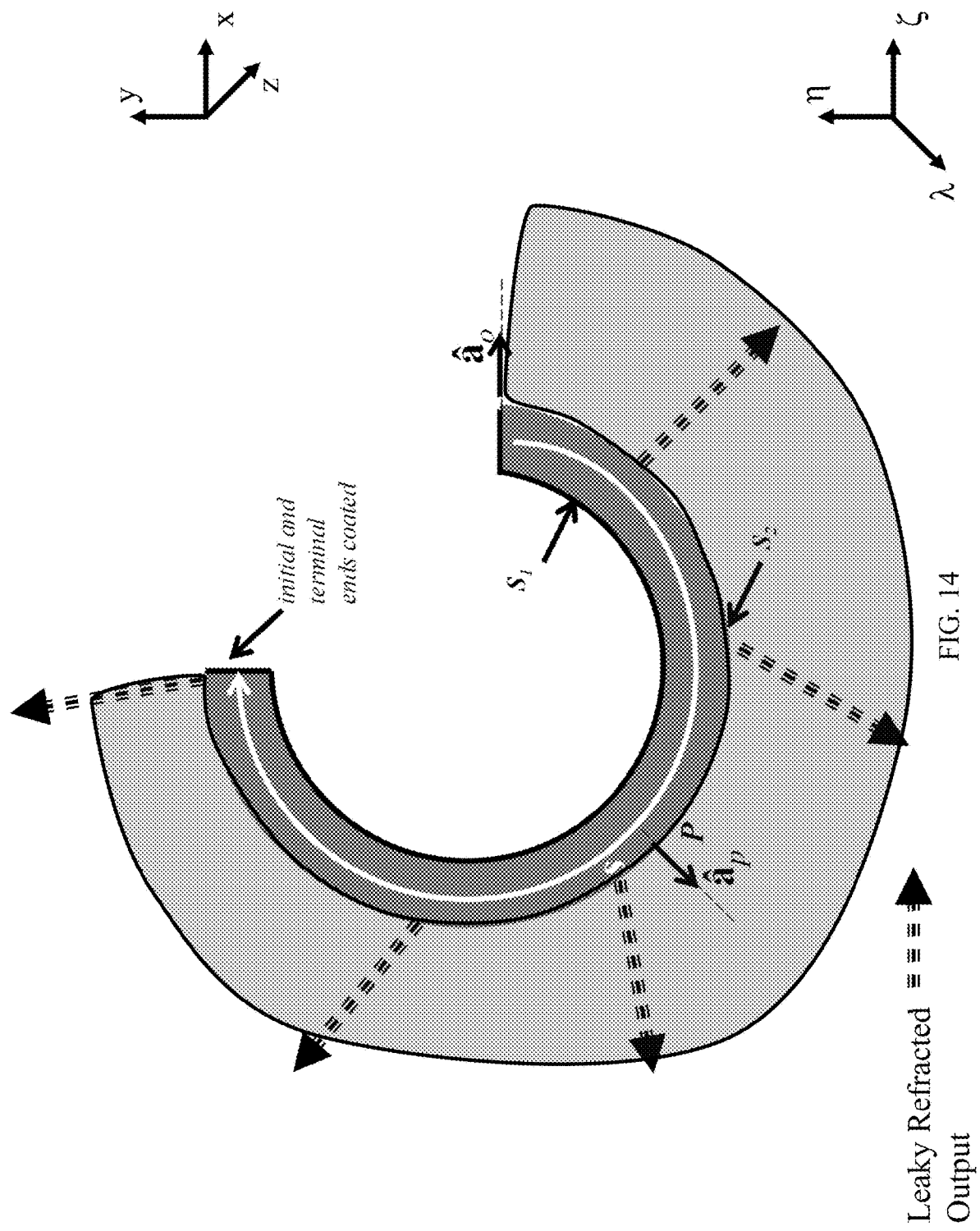
FIG. 14 illustrates another example laser sheet output and laser sheet orientation outcome.
Figure 15:
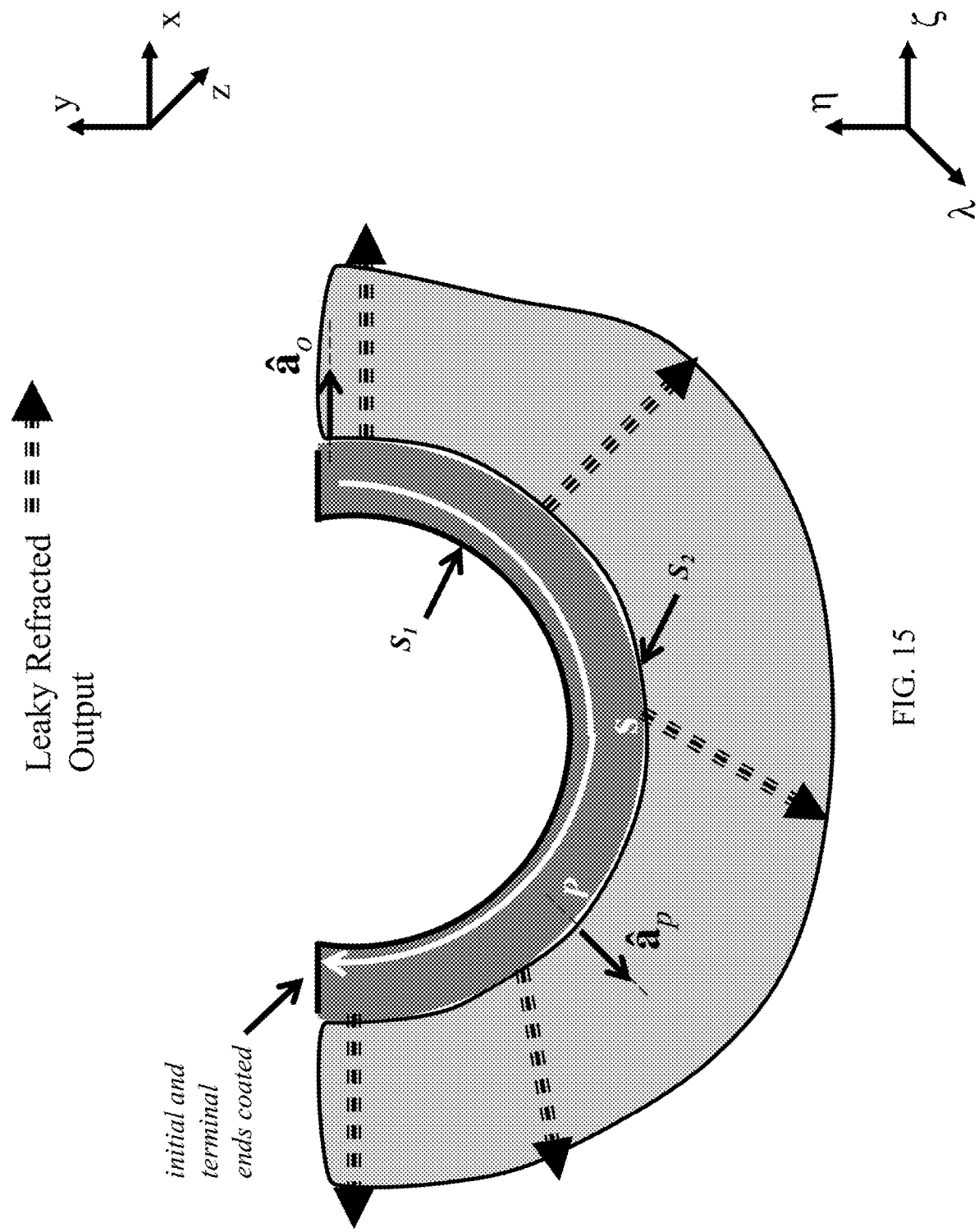
FIG. 15 illustrates yet another example laser sheet output and laser sheet orientation outcome.
Figure 16:
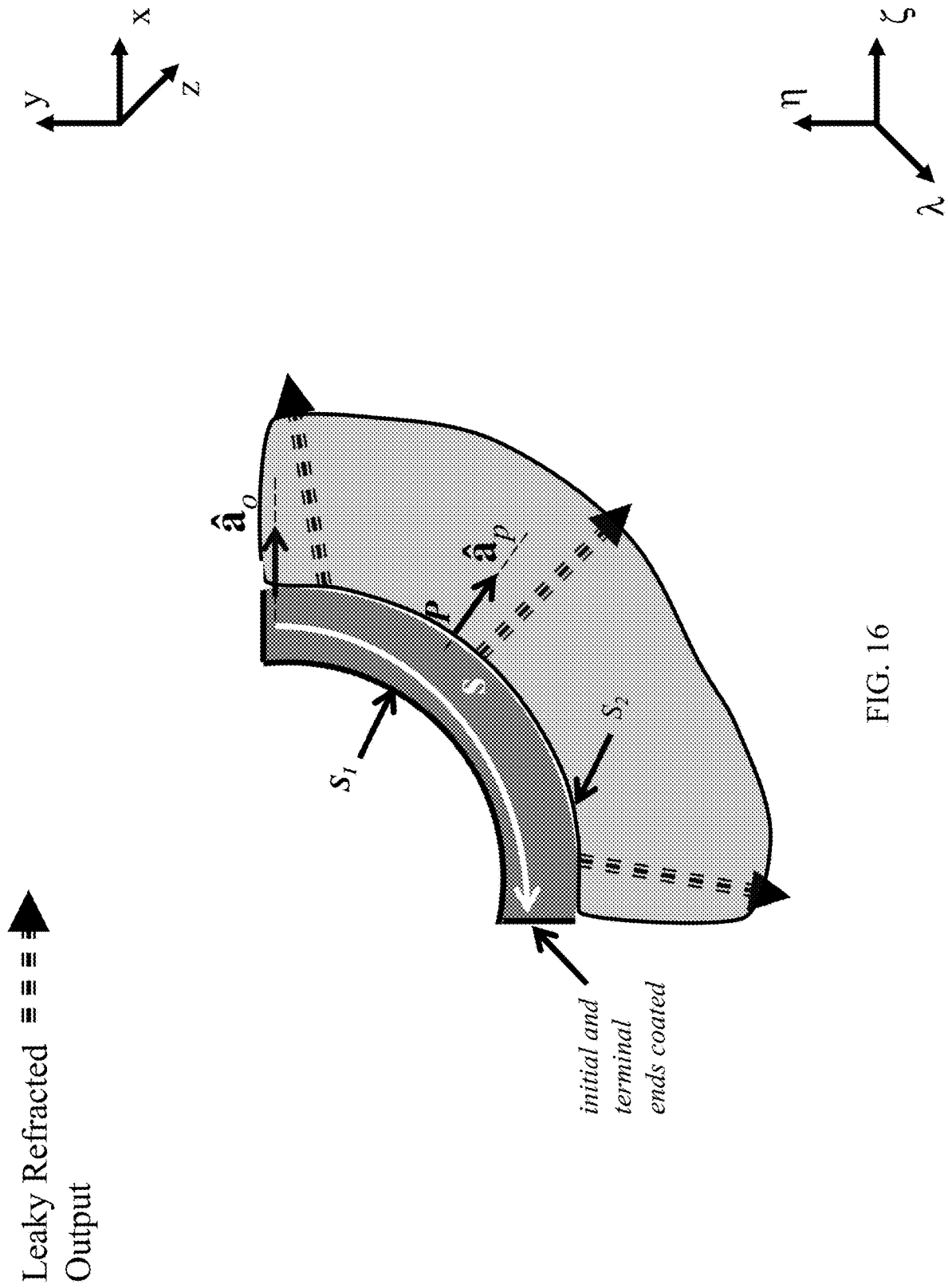
FIG. 16 illustrates still another example laser sheet output and laser sheet orientation outcome.

For FIG. 13 through FIG. 16, as the normal vector $\hat{a}_P$ is moved along an uncoated/unconditioned exterior surface that increases in length, s, the fan angle increased provided that the preferred inputs generated leaky refracted light. As the unit normal $\hat{a}_P$ is moved until reaching its starting point, without doubling back on curve s (as depicted in FIG. 13), the fan angle of light is a 360 degree output. Similarly, where $\hat{a}_P$ begins and terminates for FIGS. 14 to 16, the fan angle matches the angle traversed by path s—generating 270, 180 and 90 degree fan angle outputs, respectively.

It is lenses with topologies having these characteristics made from materials capable of transmitting and controlling EM waves which are of interest herein. The materials can be dielectric, or a composite of both dielectric and metallic. For example, it is conceivable for a prismatic rod, with hemispherical ends, to generate a 360 degree fan angle output because the unit vector $\hat{a}_P$ can travel around the exterior surface, in plan form, and end up at the material curve origin while the reflected laser wave train could traverse the lens, in plan form, generating leaky refracted laser light output. The laser source power level, the characteristic radius, strike location, and incident angle influence the outcome of the leaky laser light output. Again, the output from the oblique orientations can be 2D planar or 3D with curvature. Coatings and other surface effects can be implemented to enhance and tailor the output. For example, masking half of the exterior of the lens from FIG. 13 with 100% reflective coating would limit the output to that generated from the lens shown in FIG. 15. It is recognized here that the laser output fan angle can be controlled to approach zero degrees, where shape and/or coating configurations can lead to this limiting output in addition to power, strike, shape, and/or incident settings.

Figure 17:
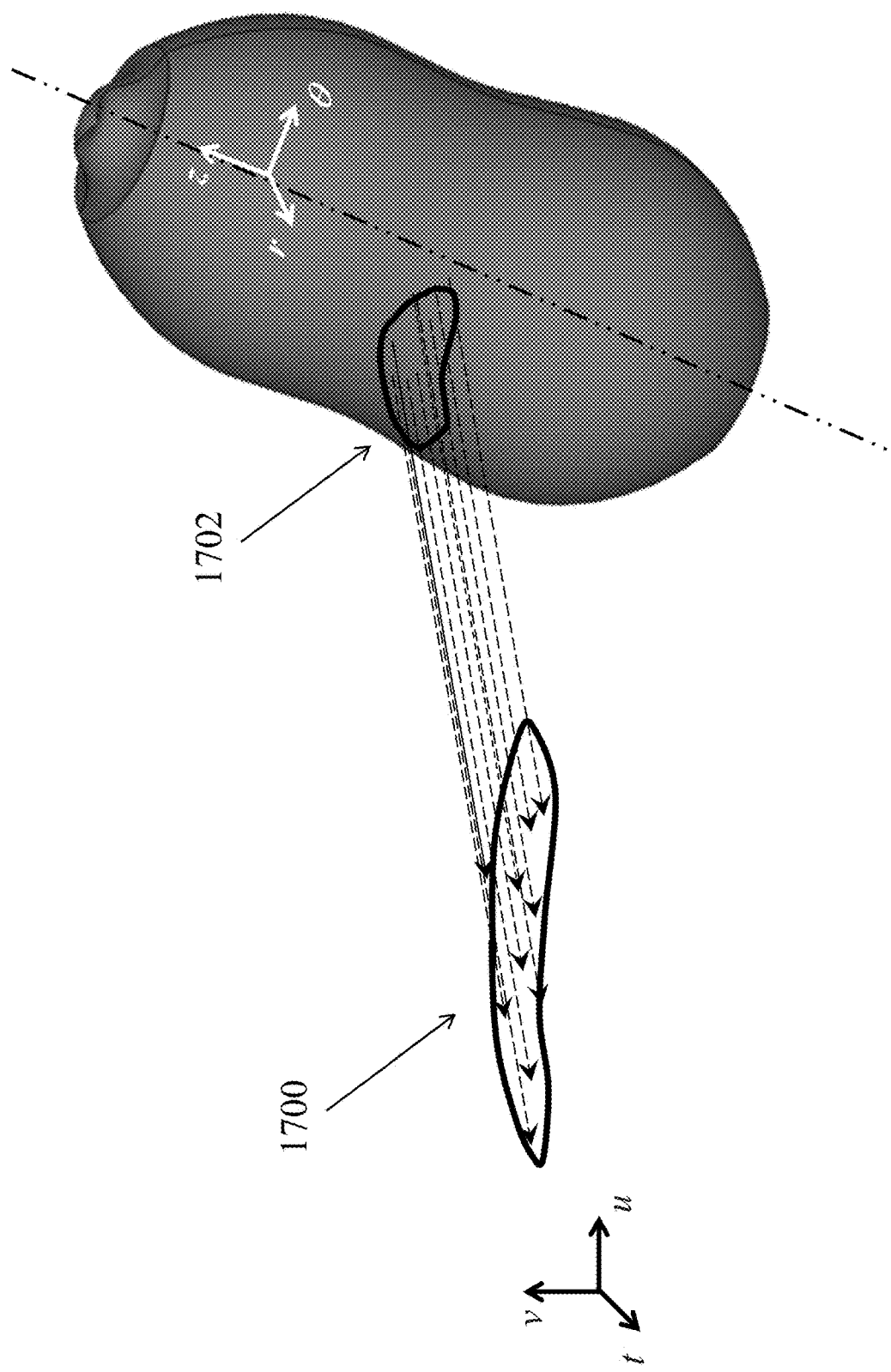
FIG. 17 depicts a qualitative overview of the laser sheet output.

FIG. 17 provides a qualitative overview of a laser sheet output from an exterior lens boundary, in terms of the underlying mathematical physics. For a preferred power level, strike location, and incident angle, the geometry of the light output striking a projection surface is shown empirically to be influenced by several parameters including at least laser beam diameter, relative distance between the lens surface and the projection surface, lens shape, lens material, the condition and conditioning of the lens surface area, and the threshold light just passing across a lens surface, where the laser source power level, laser beam incident angle, and strike location influenced the latter parameter. An arbitrary 3D surface area patch of a laser sheet 1700 can be denoted as $\Omega_P$ bound by a closed curve $\partial \Omega_P$, and an arbitrary 3D surface path of a lens 1702 can be denoted as $\Omega_L$ bound by a closed curve $\partial \Omega_L$. Both light patches $\Omega_L$ and $\Omega_P$ are subsets of the lit surfaces on both the lens and the projection surface, and represent a subset of total leaky light output from the lens. For each lens, and corresponding output configuration, a unique projection is emitted onto a projection surface. Accordingly, a mapping functions M exists which can be used to predict the unique projections, where M is generally three-dimensional.

For a generalized cylindrical lens shape, the function can be expressed as $M=M(m_1(r, \theta, z), m_2(r, \theta, z), m_3(r, \theta, z))$. With two mathematical operations involving M, the patch size of projected light area $\Omega_P$ can be predicted. Consider FIG. 17 where a generalized lens shape is shown along with the cylindrical <r, $\theta$, z> coordinate system. As noted above, a bounding curve $\partial \Omega_L$ encloses an areal patch $\Omega_L$ of emitted light over a portion of the total lens surface area enclosing lens 1702. Every point on $\Omega_L$ is assumed to emit leaky laser light, where $\Omega_L$ is a lit 3D surface area patch out of the total lens surface area. An areal patch of projected light $\Omega_P$ 1700 of a portion of a laser sheet is bound by curve $\partial \Omega_P$ in a rectangular coordinate system <t, u, v> relative to a projection surface. The mapping function M is represented as light rays with origins located at the surface points residing on areal patch 1700, which are terminated on the laser sheet patch of points bounded by curve $\partial \Omega_P$ on a projection surface. In other words, for every patch of light on $\Omega_L$ a corresponding patch of light on $\Omega_P$ is assigned, based on M. The rays representing M are shown parallel to one another but it is understood they can be randomly oriented as well.

Operating the Jacobian transform on M provides the terms for the integrand of the area integral found in Stokes' Theorem. For a fixed set of parameters, these mapping functions can be utilized to predict the size of the projected image $\Omega_P$ on the projection surface for any $\Omega_L$. In theory, closed form prescriptions of M can be written if it is known how ray tracing and the identified parameters above relate to each other functionally. In this configuration one would operate the cylindrical Jacobian transform on M to get an ordered set of functions. These ordered functions are permutations of the products of slopes, and differences thereof, which carry physical meaning. These slope products and differences thereof can be grouped, while preserving the physical significance, into the corresponding expressions of the area integral found in Stokes' Theorem, hence allowing the prediction of the size of the areal patch $\Omega_P$.

In practice, explicit closed forms of M are scarce, however, M can be constructed automatically through the use of engineering software assuming that the functional relationships discussed earlier were known and programmed into modules. Numerical fusion of these mathematical relationships make the construction of M tractable such that the size and shape of $\Omega_P$ can be designed appropriately. Surface designs on both $\Omega_L$ and $\Omega_P$ can be made experimentally or with engineering tools to meet service and performance requirements. These tools typically leverage Bernstein polynomials, and polynomial curves represented by Basis splines, and non-uniform rational Basis splines (NURBS), which can approximate the shapes of the surface bounding the lens sections constructed from the curve set shown in FIG. 12 and numerous others as well, not shown in FIG. 12. Euler, MacLaurin, and others have shown that most of the curves represented by the functions shown in FIG. 12, and other functions, can be expressed in terms of power series expansions.

By expanding the curves like those from FIG. 12 and others into power series format they are classified as polynomials. As the number of terms in the power series grows, for a given curve, the summation of the series expansion approaches the closed form function of the curve. It can be said that the curves from FIG. 12 are a subset of the collection of Bernstein polynomials and that the Bernstein polynomial set, as well as polynomial curves generated by Basis splines, NURBS, I-splines, M-splines, and T-splines can define lens sections and surface shapes.

These mathematical formulations assume perfect curves, areas, and volumes; however, manufactured lenses approach perfect geometries nearly while the materials have imperfections through the volume and on bounding surfaces. These imperfections influence the output and can be minimized with manufacturing control processes. Surface conditioning can be applied to tailor the lens output depending on the service requirement. Other additions to the curve descriptions found on FIG. 12 that can appear on manufactured lenses include but are not limited to simple and compound fillets which would smooth the idealized sharp edges and pointed vertices at cusps presented herein.

As suggested above, lenses can be in the shape of prisms, ring sectors, full rings, discs, plates, shell sectors, shells, and solid volumes. Moreover, all lenses can have race features that are solid or hollow. These races can have shaped entrance and exit ports and other features that enhance the laser sheet output. Samples of these lens configurations are described below.

Generalized sections, which can be used to form prisms, rings, discs, plates, shells, and solid volumes, and where applicable sectors/sections thereof, are presented next. These shapes have the geometric constructs that produce 2D planar and 3D curved laser sheet output similar to that detailed in FIGS. 11 and 13 to 16. Sections can be formed by chaining several curves, and segments thereof, of the same type, or they can be formed by chaining one or more different curve types together. It is noted again that all of these curves and curve segments can be approximated as closely as desired by Bernstein polynomials. Splines can also be used to construct the curves graphically. The materials used for the base material of these lenses can be dielectric or a composite of both dielectric and metallic.

Figure 18:
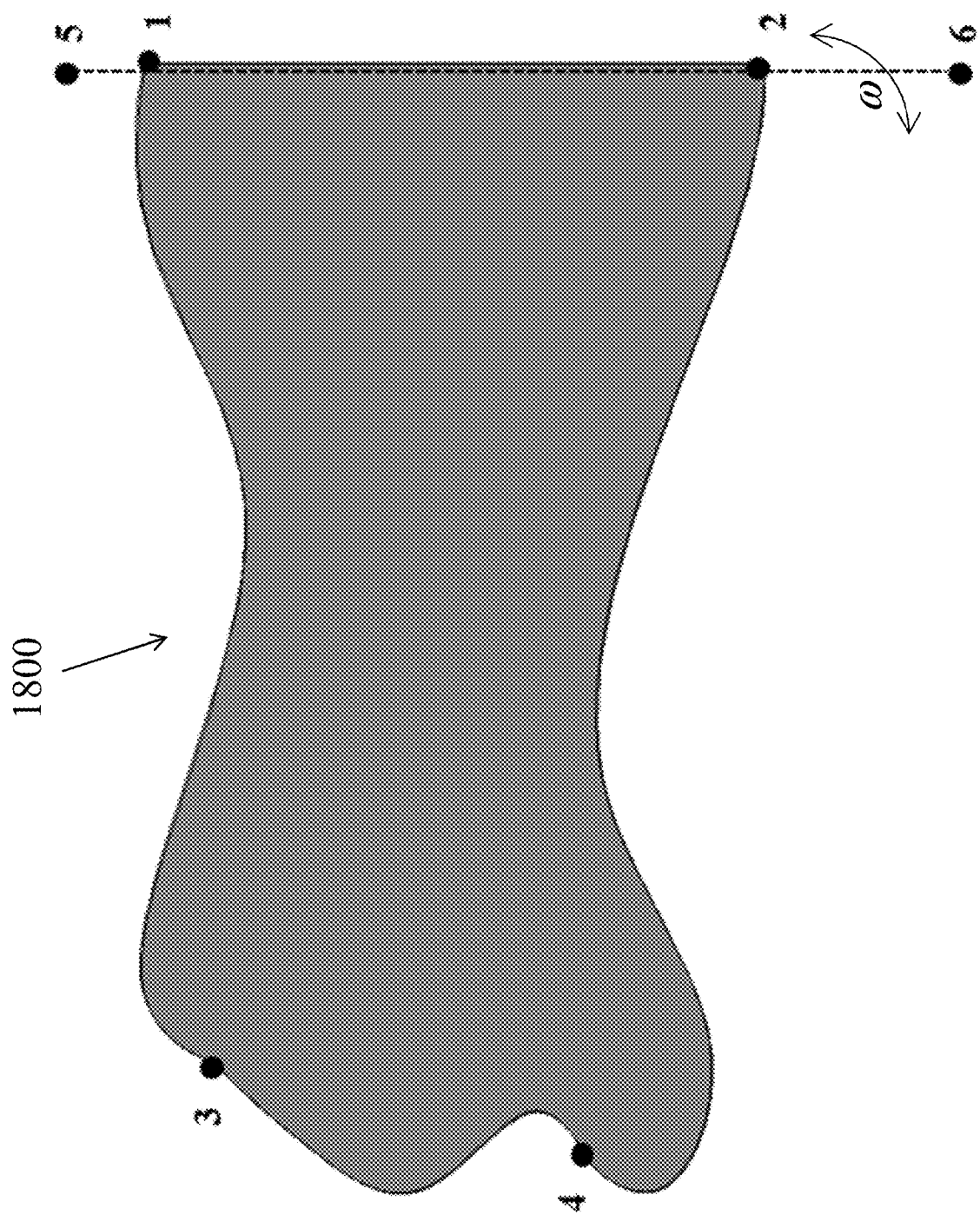
FIG. 18 illustrates an example simply connected section of revolution for a lens.

FIG. 18 illustrates a simply connected section 1800 of an arbitrary disc bounded by four arbitrary curves with beginning and ending points 1, 2, 3, and 4. A vertical axis defined by points 5 and 6 is shown along with an angle $\omega$. The angle $\omega$ indicates that an arbitrary section could be spun about the vertical axis to generate a disc sector or a full disc. Discs can be identified as lenses with diametric length dimensions that are greater than the thickness dimensions. For thin discs, one could impose a limit to the ratio of these dimensional components as 1/10, or larger ratios for thicker discs. Lenses as plate shapes, on the other hand, can have the same aspect ratio requirement for a section, however, the diametric component would be replaced with geometries that were not diametrical—for example, polygons or kidney shapes with thickness.

Figure 19:
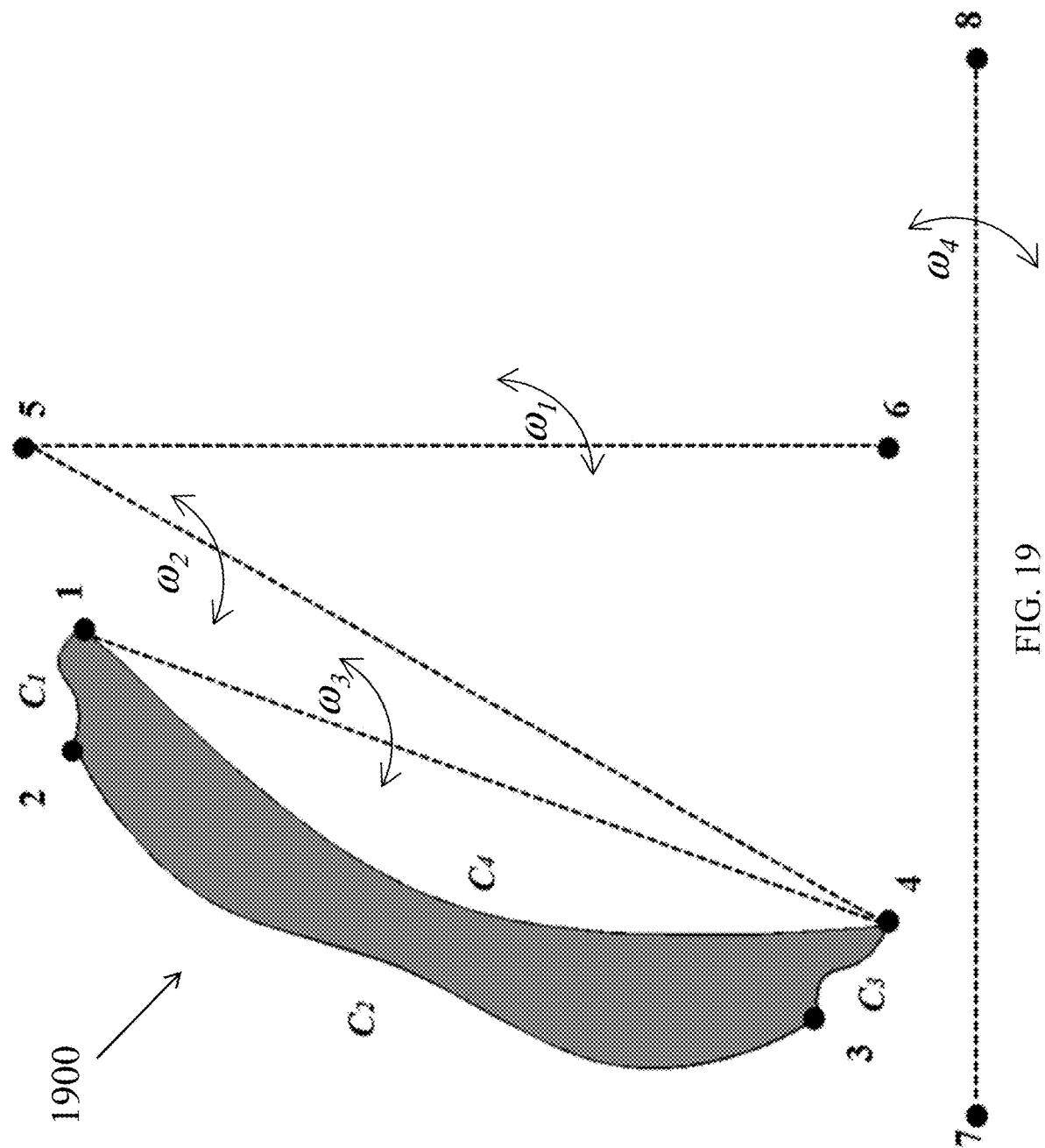
FIG. 19 illustrates another example simply connected section of revolution for a lens.

Similar to FIG. 18, FIG. 19 also illustrates a simply connected arbitrary lens section 1900 defined by four curves $C_1$, $C_2$, $C_3$, and $C_4$ with beginning and ending points 1, 2, 3 and 4. Four axes are shown with four angles $\omega_1$, $\omega_2$, $\omega_3$, and $\omega_4$. Spinning the section about the axes defined from points 5-6 or 7-8 over angles $\omega_1$, and $\omega_4$ will generate shells which are open on the ends of the section. Depending on the angle used to spin the sections, the lenses can be shell segments or full shells. Spinning the section about axis 4-5 generates a full shell with a closed end if $\omega_2$ is $2\pi$, and a segmented shell closed on one end for $\omega_2 < 2\pi$. Spinning the section about axis 1-4 generates a full shell with closed ends if $\omega_3$ is $2\pi$ or a segmented shell closed on both ends for $\omega_3 < 2\pi$. If aspect ratios of the arbitrary section shown approach one, the shell turns to a ring when the section is spun about axis 5-6. For $\omega_1 < 2\pi$ ring sectors are formed, for $\omega_1 = 2\pi$ full rings are formed. From a topological vantage point, lenses formed into open full shells and full rings could be construed to be multiply connected. In a strict sense, for these shapes a theoretical loop cannot be pulled closed without leaving the surface. Accordingly, these lenses are not simply connected although the sections shown here are simply connected.

Figure 20:
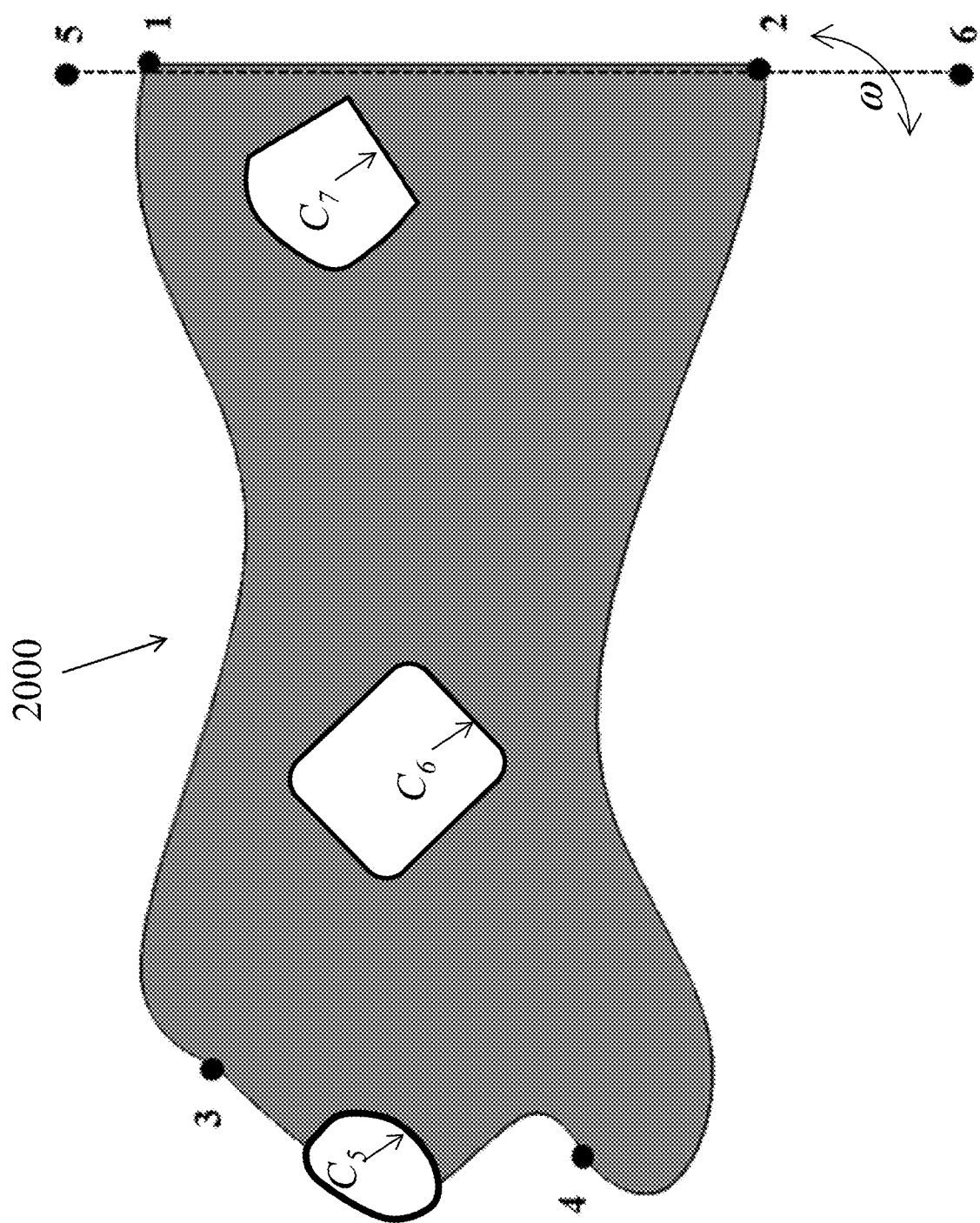
FIG. 20 illustrates an example multiply connected section of revolution for a lens.
Figure 21:
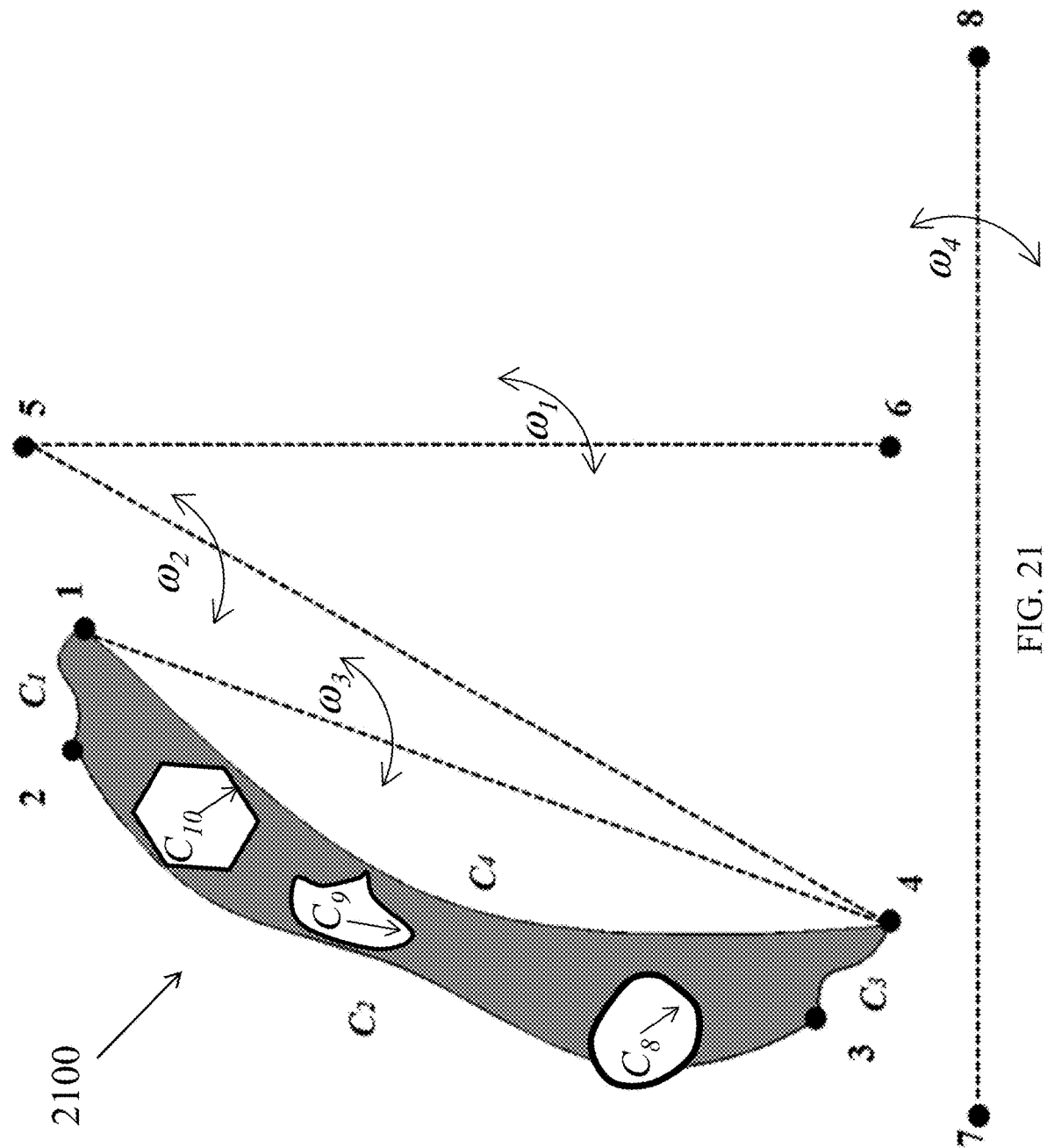
FIG. 21 illustrates another example multiply connected section of revolution for a lens.

The content of FIG. 20 and FIG. 21 is similar to that of FIG. 18 and FIG. 19, respectively, except that the sections are multiply connected. That is, FIG. 20 illustrates lens section 2000 having the same shape as section 1800 of FIG. 18 but with cavities $C_5$, $C_6$, and $C_7$, and FIG. 21 illustrates lens section 2100 having the same shape as section 1900 of FIG. 19 but with cavities $C_8$, $C_9$, and $C_{10}$. The cavities in these sections ($C_5$, $C_6$, $C_7$, $C_8$, $C_9$, and $C_{10}$) can represent local features, periodic features, or a-periodic features that vary with angle $\omega_j$ (j=1, 2, 3, 4)—or they can represent sections of continuous tubes (races) for laser light to traverse through, where the tubes can split at one location and rejoin at another location. The inner curve sets $C_5$, $C_6$, $C_7$, $C_8$, $C_9$, and $C_{10}$ contained in these sections can be smooth curves or straight curves with discontinuities or a combination of both. The smooth curves can have cusps, however, it can be argued that manufactured products do not have infinitely sharp edges. One or more cavities can be included, and these cavities can be filled (partially or totally filled) with other materials. Here, it is understood that the curve label Cn can refer to a group of curves chained together by coincident end points. Also, the number of cavities in FIG. 20 and FIG. 21 is depicted as three (3), however, there can be 1, 2, 3 or more of these cavities in a multiply connected section where suitable.

Next, various lens shapes capable of providing a curved 3D laser sheet are described.

Figure 22:
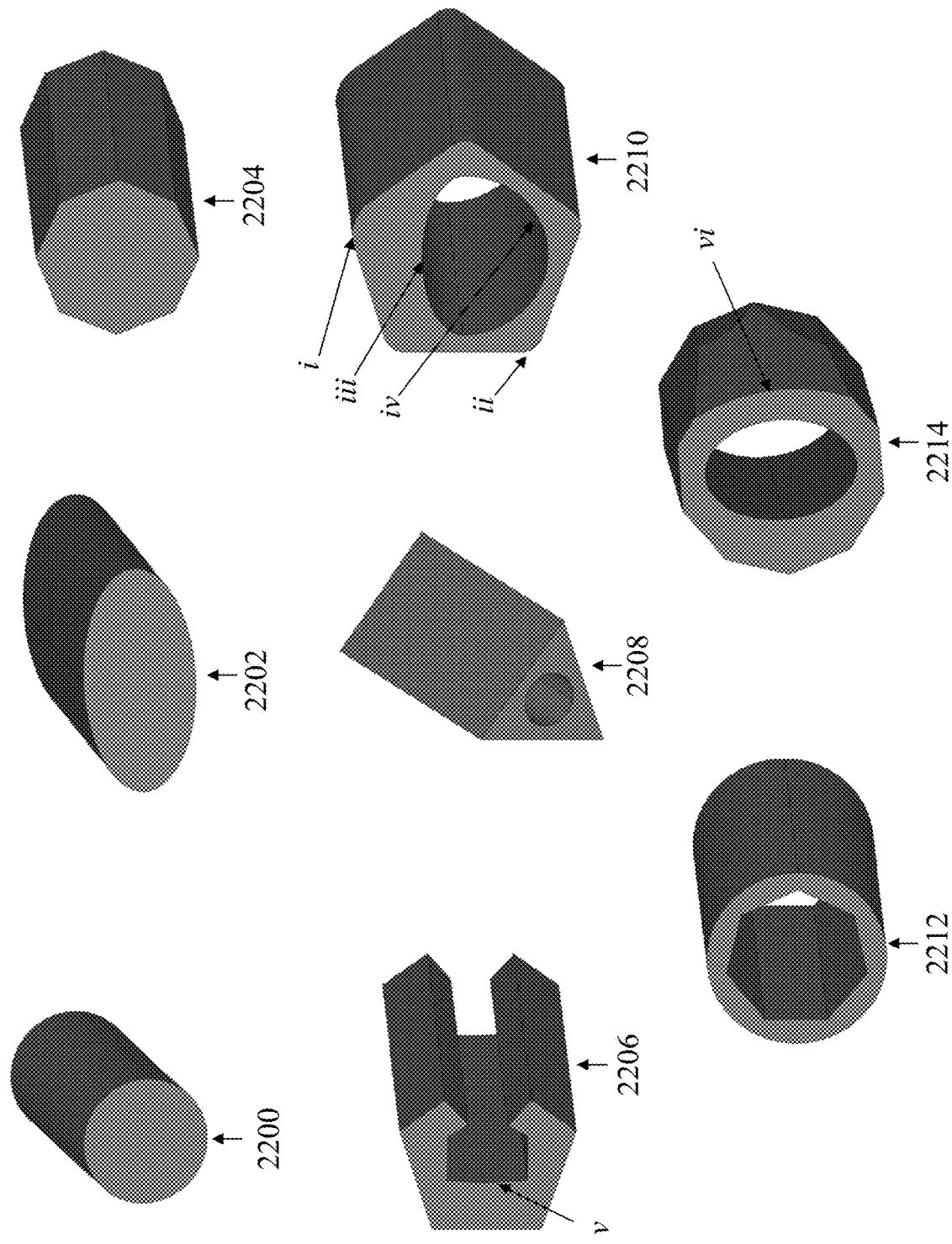
FIG. 22 illustrates a plurality of example prismatic lens shapes.

Examples of lens shapes with simply connected sections having definite bounding curves are provided next at FIG. 22. The sketches demonstrate a few of the many possible configurations that can produce a laser sheet output in 2D planar and 3D with curvature forms. These shapes are merely examples of how the above-discussed primitive curves can be used to design lens sections. These examples are not exhaustive; however, they provide samples of the essential shapes which are capable of transforming a laser beam into a sheet—where the fan angle can span angles from zero to 90 to 180 to 360 degrees. Sections can be formed by chaining several curves of the same type, and segments thereof together, or they can be formed by chaining one or more different types together. For example, prism 2210 includes multiple sections providing a large fillet feature i, a small fillet feature ii, an ellipse feature iii, and a circle feature iv. In other examples, prism 2206 includes a sinh feature v; and prism 2214 includes a cycloid feature vi.

That is, the prismatic lenses illustrated include examples swept from sections that are simply connected without a cavity, simply connected with a cavity, or multiply connected sections, and in many examples, where the prism length is much greater than the longest section length. Prismatic lenses 2200, 2202 and 2204 have simply connected sections that are circular, elliptical, and an 8-sided polygon, respectively. Prismatic lens 2206 is a simply connected section with a cavity that has five straight sides on the exterior, four straight sides on the inboard region, and a curve segment defined by sinh, where the inboard and outboard regions are joined by two straight curves at two locations. The last four prisms are formed from sections that are multiply connected. Prismatic lens 2208 has a section with three straight curves on the exterior and a circular curve on the inboard region. Prismatic lens 2210 has a section defined by five straight curves each joined by fillets on the exterior, and the inboard region is bounded by a circular curve segment and an elliptical curve segment. Prismatic lens 2212 has a circular exterior with a seven sided polygon for the inboard region. Prismatic lens 2214 has a section with an elliptical inboard region and a ten sided polygon on the exterior that is truncated by a 3D cycloid surface, where multiple curves are chained together bounding the truncated surface on the exterior.

In general, the aforementioned prismatic shapes show examples of how curves and curve segments can be used to construct lenses or lens sections where the curves are of one type, and with more than one curve type changed together. They also demonstrate that simply connected sections with and without cavities have exterior surfaces that are defined with straight curves and curve sections illustrated in FIG. 12. Also demonstrated are multiply connected sections that have both inboard and outboard regions defined by both straight curves and other curves from FIG. 12. The fillets, chamfers, bevels or otherwise rounded edges or corners introduced are expected to be on all lens shapes produced, to some degree, due to manufacturing processes.

The curves and curve segments discussed above with respect to FIG. can be approximated by Bernstein polynomials, with uses and restrictions imposed on them by convention (the resulting curves due to the imposed restrictions on Bernstein polynomials are known as Bezier curves). This recognition is founded primarily on Weierstrass' Approximation theorem. A 2D generalization can be found in the Stone-Weierstrass theorem where the compact Hausdorff space is considered. Furthermore, Runge's theorem, related to the issue, uses compact sets composed of complex numbers to approximate curves bounding multiply connected regions. Moreover, the literature regards Mergelyan's theorem as the ultimate generalization of Weierstrass' approximation theorem and Runge's theorem, and showed the complete solution of the classical problem of approximating curves with polynomials using complex analysis. The set of splines are used in commercial engineering analysis software which employs polynomials to construct curves and curve surfaces. These splines are referred to as Basis splines, B-splines, and Non-uniform Rational B Splines (NURBS), where NURBS are an extension of the B-spline. These spline functions are piecewise polynomials that can be continuous and also have continuous derivatives. These bounding curves can be designed to generate bounding surfaces to manufacture lenses. Other splines schemes include I-splines, M-splines, and T-splines and other spline schemes not listed here. Lenses with definite shapes bounded by curves forming simply connected sections without cavities, simply connected sections with cavities, and/or multiply connected sections can have base materials that are dielectric or a composite of both dielectric and metallic materials.

Figure 23:
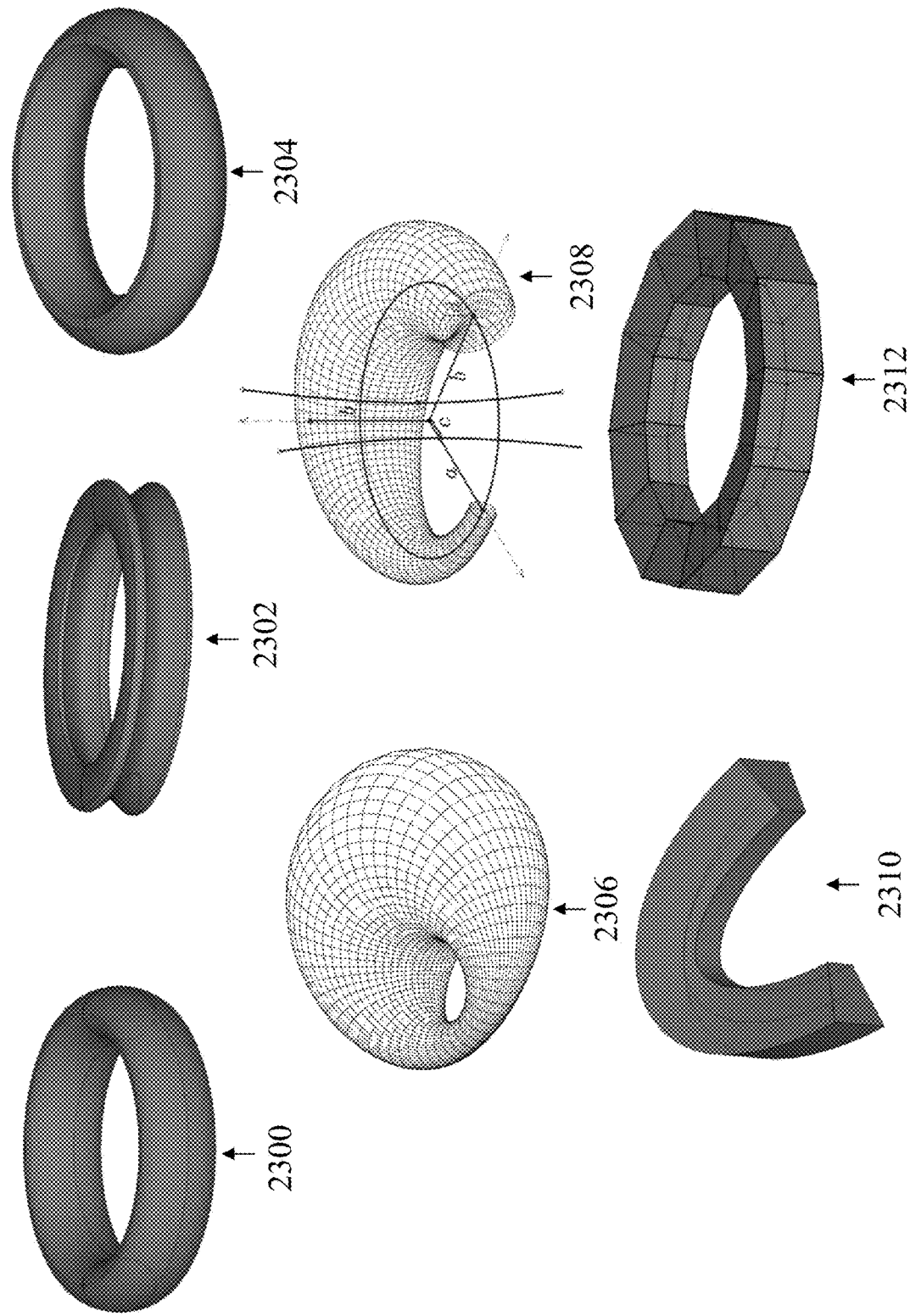
FIG. 23 illustrates a plurality of example ring-shaped lenses.

Various full or partial ring-shaped lenses are next shown in FIG. 23. From a topological perspective, full rings can be thought of as multiply connected solids with sections that may or may not be simply connected. The first full ring lens 2300 has a section defined by an ellipse. The second full ring lens 2302 has a section defined by hyperbolic curves on the surfaces with the inner most radius and outer most radius, where these two curves are connected by a parabolic segment on top and a straight curve on the bottom, and where fillets close the section in between the curve set. The third full ring lens 2304 has a section defined by a hyperbolic curve on the inner radius and an ellipse on the outer radius, where these curves are joined by two straight horizontal curves. A Dupin cyclide is presented as a solid ring lens 2306. This Dupin cyclide is a canal surface having two directices—one hyperbolic and the other an elliptic. This cyclide has circular sections with radii that vary along the tangent direction. The directices are shown at partial ring lens 2308. The Dupin cyclide demonstrates how the section can vary with the material curve s.

Ring lens 2310 is an open ring segment having a trapezoid section that is swept about the arc of a cycloid. Cycloid curves come from the curve set known as Roulette curves, where a Roulette curve is generated by the trace of a point on a circle as it rolls over another stationary curve without slipping. For the case of a cycloid, the other stationary curve is a straight line. Other Roulette curves, in addition to that from FIG. 12, within the scope of this disclosure are epicycloids, hypocycloids, and involutes. Cycloid paths, and other curves, and the curves from FIG. 12, can be used to sweep sections about which define rings, and shells. The cycloid curves can also be used to define lens sections and race sections.

Moreover, it is possible to chain prismatic segments together so that they too wrap around a common axis producing closed ring shapes that are known as toroidal polyhedrons. One such example is shown by ring lens 2312 of FIG. 23, where the truncated prismatic ends that coincide fit flat at the interfaces.

Figure 24:
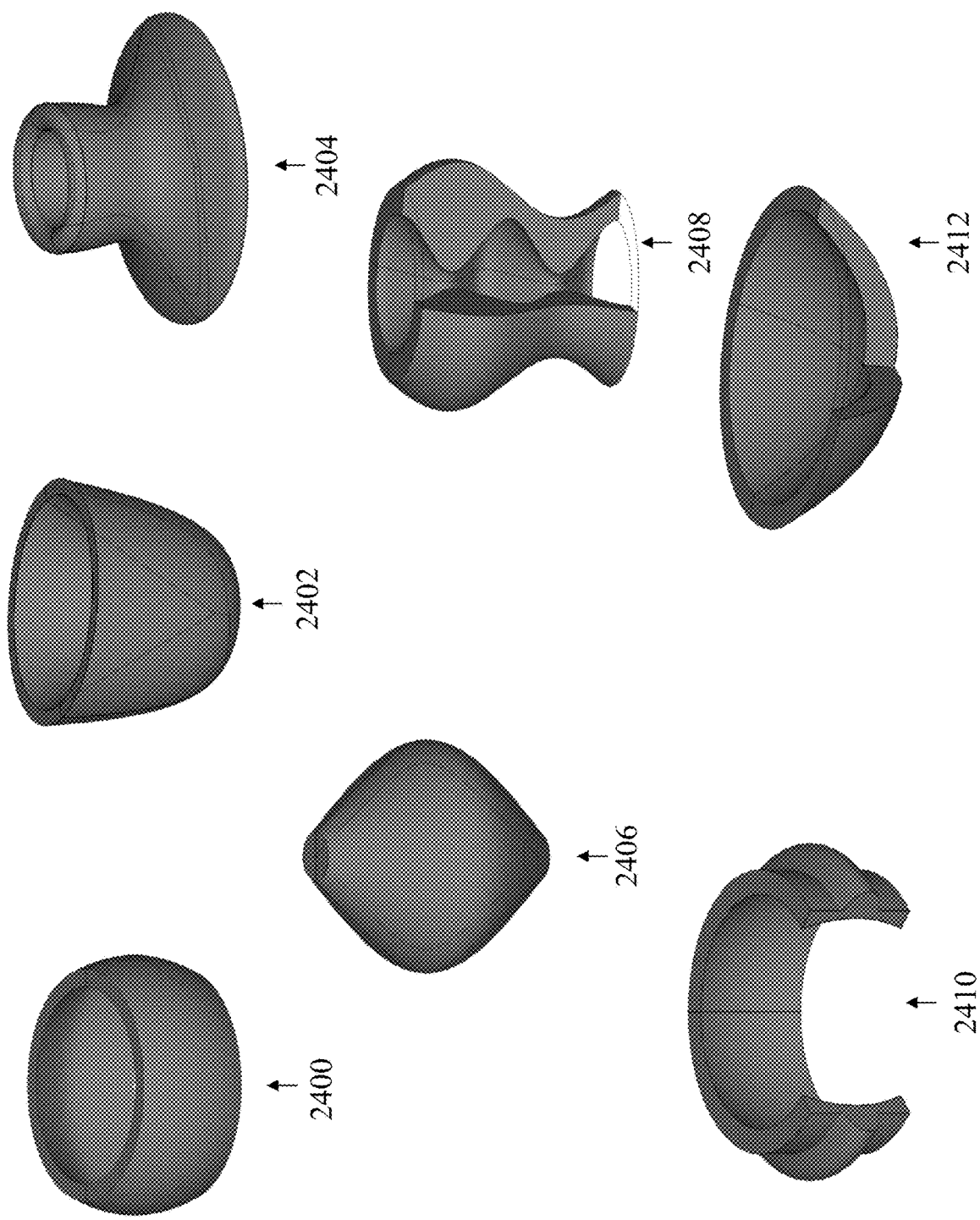
FIG. 24 illustrates a plurality of example shell-shaped lenses.

Further, the curves of FIG. 12, and others, can be used to bound sections of shell lens, for example, as illustrated in FIG. 24. These shell lenses can be centrally open, fully closed, and/or have an open end, where curves, such as a hyperbolic or parabolic curve can define inner or outer surfaces. In some embodiments, upper and/or lower surfaces can be truncated to provide flat surfaces. In some embodiments, inner or outer surfaces can be at least partially defined by an exponential function, by a straight inclined curve, and/or by curves multiplied together. For example, shell lens 2400 has a parabolic exterior and hyperbolic interior. Lens 2402 has one open end with an interior surface defined by inclined straights, and an outer surface defined by an exponential curve, and a flat on the upper most surface. Lens 2404 has one open end defined by a fillet, and a lower portion defined by two curves multiplied together $\exp(x) \times \sin(x)$, one offset from the other. Lens 2406 has hyperbolic sides with closed ends. Shell lens 2408 has an inner surface defined by the cosine function, and an outer surface defined by a sine function. Lens 2410 is defined by a flat top, elliptical inner surface, and parabolic middle exterior portion with flat edges above and below. Finally, lens 2412 has a straight flat top edge with inner and outer surfaces defined by cycloids one offset from the other.

Figure 25:
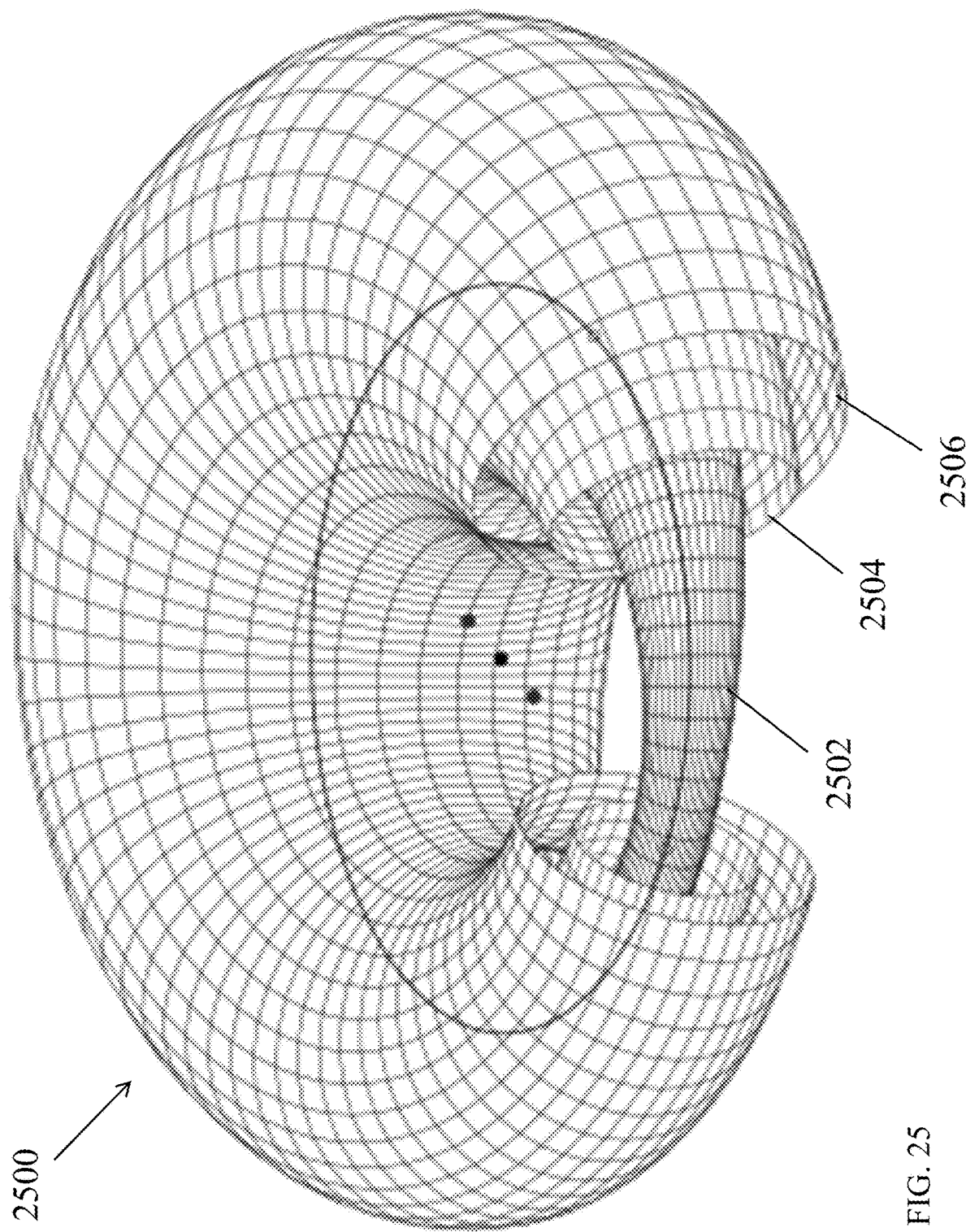
FIG. 25 illustrates an example multi-shell shaped lens.

FIG. 25 depicts a particular embodiment of a multi-shell lens 2500 having a shape of a Dupin cyclide, where the shell thicknesses are hyper-thin. The three spokes, extending from a respective inner shell to a respective outer shell, positioning the shells relative to one another are not shown. A portion of two of the shells is removed to show the internal shapes enveloped within. The inner most shell 2502 is a full 360 degree closed shell, whereas the outer shells 2504 and 2506 are examples of how the Dupin cyclide can be either a full shell or a shell sector. Thin shell thicknesses can assume values up to 1/10 the radii of a given section. Shell thicknesses larger than that are known as thick shells. The figure demonstrates how the circular sections change along the tangential direction and how the Dupin cyclide can be parameterized to assume many similar shapes. The elliptical directrix and the points where the hyperbolic directrices pass thru the plane of the origin also are shown. This sample shape demonstrates how hyper-thin walls can be used to construct lenses having limiting bounding surfaces. In the limit, hyper-thin walls can approach thicknesses of coatings or foils; however these limits are extreme; and practical hyper-thin wall thicknesses are assumed to be less than 50 mils.

Figure 26:
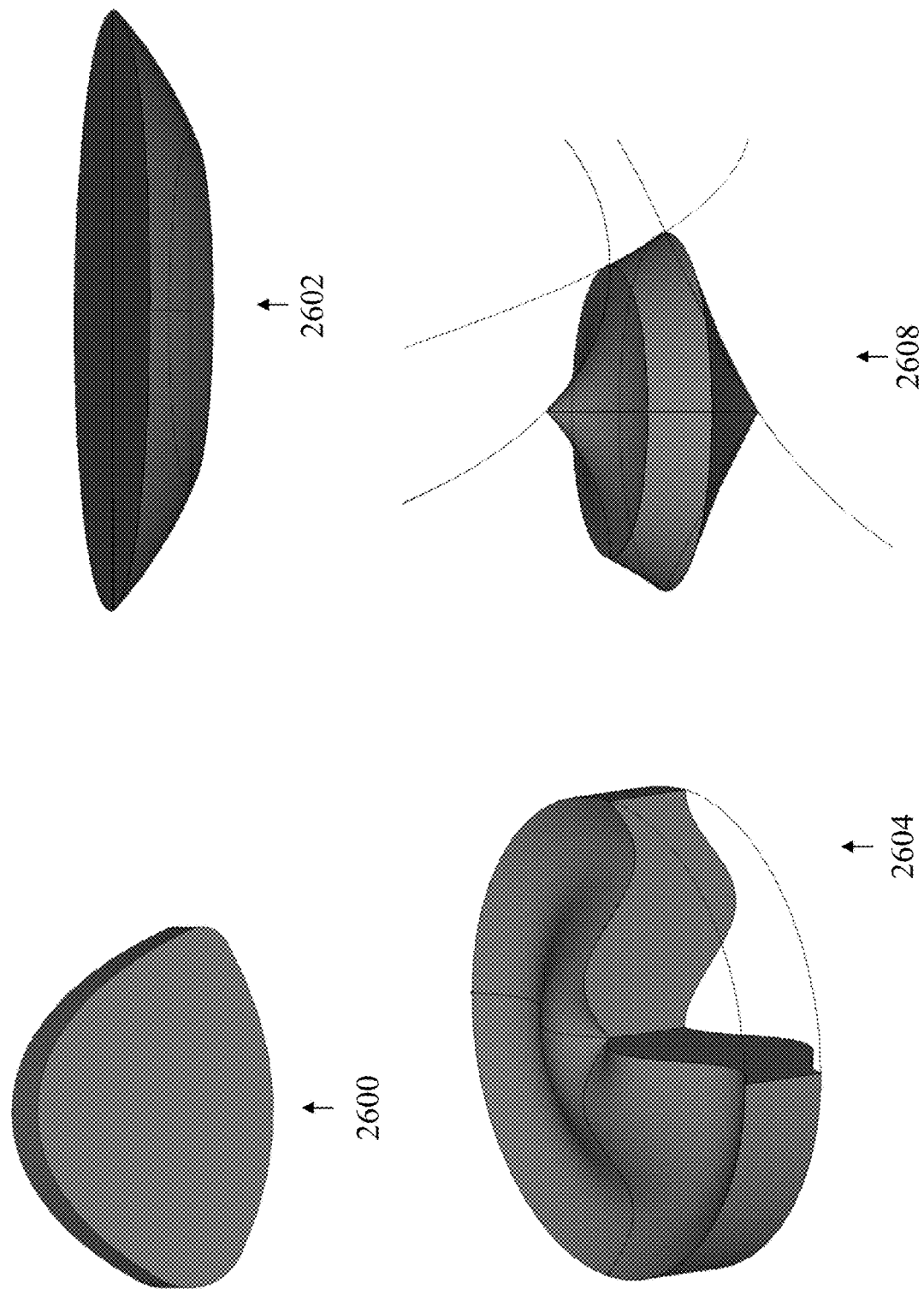
FIG. 26 illustrates a plurality of example disc-shaped lenses.

In addition to shell-shaped lenses, disc-shaped lenses can be formed. In some embodiments, a lens thickness can be smaller than the minimum in-plane dimension. Some example disc-shaped lenses having simply connected sections without cavities are illustrated in FIG. 26. For example, disc-shaped lens 2600 has a section defined by chaining a cycloid and parabola with two fillets between the two curves. Lens 2602 is defined by a section with an outer most radius curve forming a catenary along with two straight curves that formed flat upper and lower surfaces on the lens. Disc lens 2604 has upper and lower surfaces defined with sine and cosine curves that form a cusp at the disc center on the upper surface. Lens 2608 has upper and lower cusps, the section formed by intersecting cosh and sinh curves with the Laguerre function $0.5(x^2-2x+2)$ and sweeping the section about an axis passing through the cusps. Again, if the angle of revolution $\omega$ is $<2\pi$ the lens would be a disc segment, and if the angle of revolution equals $2\pi$ the lens would be a full disc.

Figure 27:
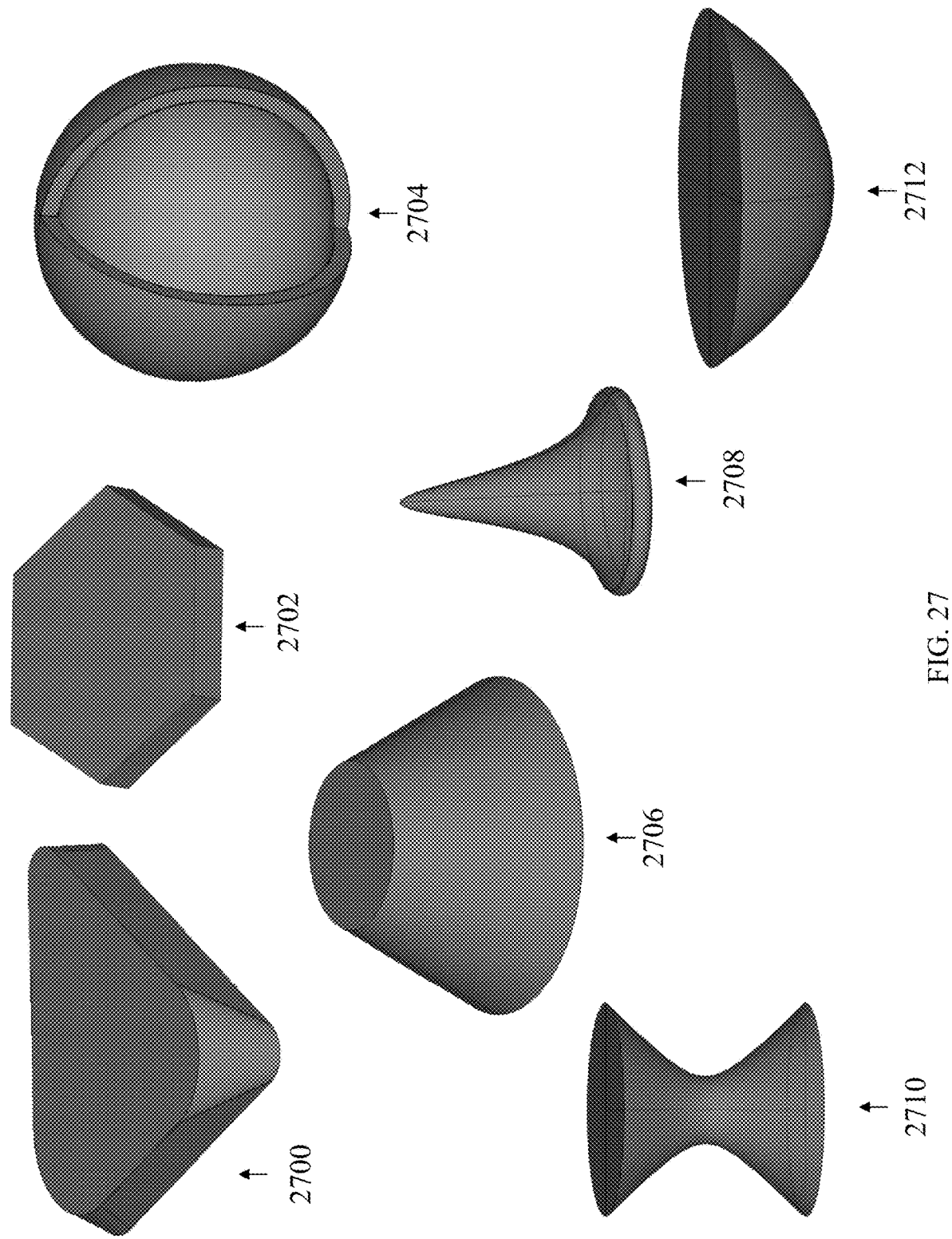
FIG. 27 illustrates a plurality of example plate and solid volume lenses.

Lenses shaped as plates, similar to discs, have thicknesses that are much smaller than the smallest plan-form dimension shown here where the section is not revolved about a common axis. Plates with triangular and polygonal plan-forms, such as discs 2700, 2702, respectively, as seen in FIG. 27 can be formed. In some embodiments, lenses according to the present invention can have solid shapes as also seen in FIG. 27. These lenses may have shapes corresponding to spheres 2704 (having a metallic inner core and outer dielectric layer), truncated cone 2706, shape 2708 with a section defined by a chain of a straight horizontal, a fillet, and an ellipse divided by a parabolic curve, and hyperboloid 2710, or a solid 2712 with a section composed of a cycloid curve and a horizontal straight curve. In some embodiments, a lens, such as a solid shape lens, can be composite, such as having a metallic interior enclosed by a dielectric external layer.

Figure 28A:
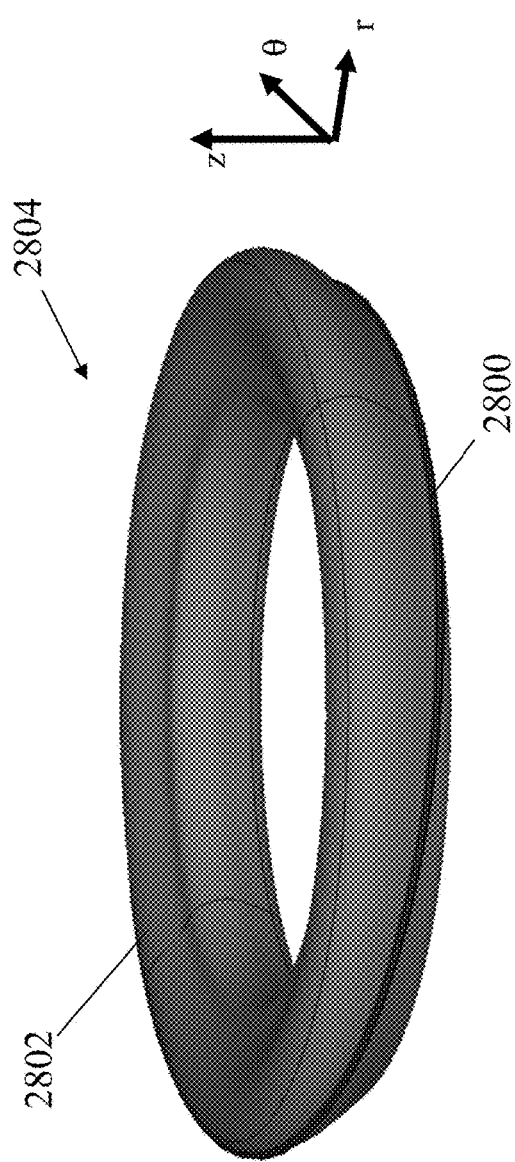
FIG. 28A illustrates an example ring-shaped lens having a race formed about an exterior surface thereof.
Figure 28C:
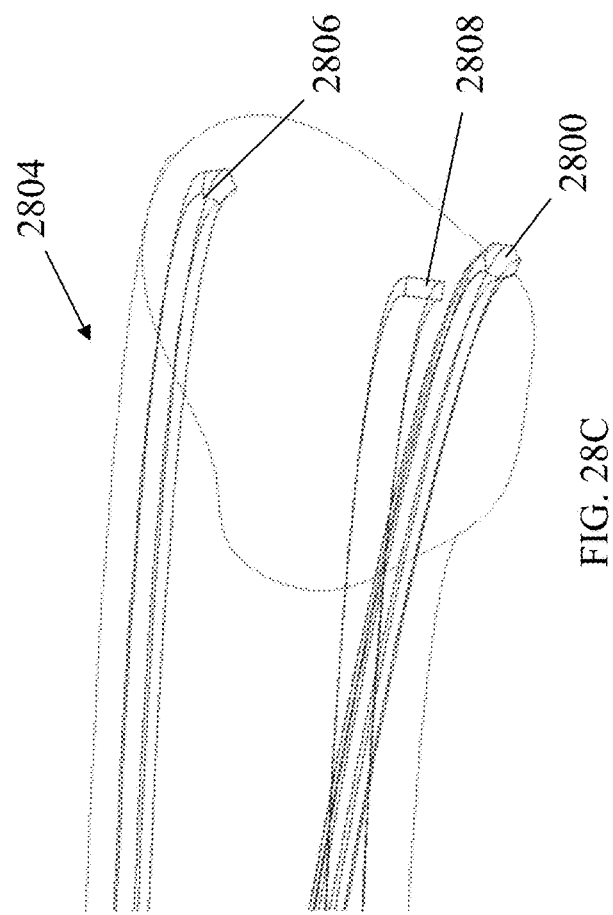
FIG. 28C illustrates another portion of the ring-shaped lens of FIG. 28A showing the trace of a plurality of interior races.
Figure 28B:
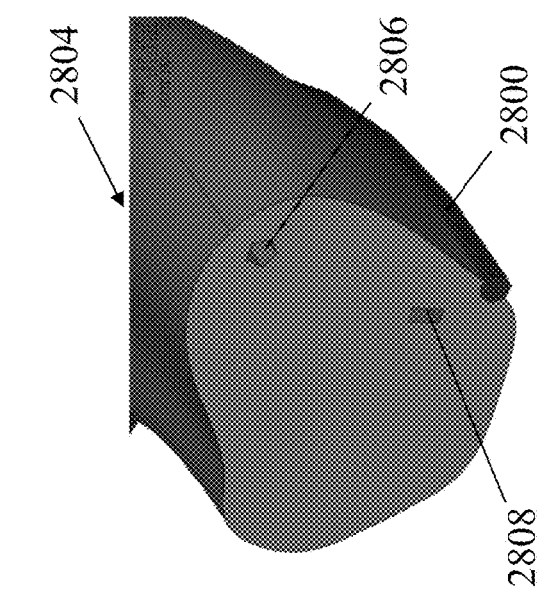
FIG. 28B illustrates an portion of the ring-shaped lens of FIG. 28A with a plurality of interior races.

FIGS. 28A-C illustrate race features integrated into a circular ring with a generalized section. The solid race also has a generalized section. These features can also be incorporated on prisms, plates, discs, shells, and solid volumes, among others. Race features can be solid or hollow. Similar to lens sections, race sections can be derived from the curves shown in FIG. 12 among other curves that can be described by Bernstein polynomials, Bezier curves, and a plurality of splines, and the like.

Turning first to FIG. 28A, a race 2800 is a solid with a generalized section swept along a plane that has a normal direction oblique to the z-axis, and is embedded into a toroid surface 2802 of the lens 2804. The material of the race 2800 can be a dielectric, different than the base material of the lens 2804. The base material of the lens 2804 can be metallic or dielectric. FIG. 28B shows a general section of lens 2804, with races configured from polygon shapes. Races 2806 and 2808 are hollow internal to the lens boundary while the third race 2800 is solid and integrated to the surface of the lens as described above. FIG. 28C illustrates the lens material being transparent to enable a view of how the races 2800, 2806 and 2808 are swept about planes that are oblique and parallel to the respective lens 2804. Regarding race ports, or inlets and outlets from the main lens body, such ports can be shaped with uniform cross sections or variable cross sections. It will be appreciated that such solid and hollow race features can be integrated into any suitable shape and can traverse lens sections of different shapes. The races may also be of any dielectric material and/or contain coatings and/or layerings already discussed. The ring shape was chosen to present race and associated features due to geometric simplicity. Further, races may split into a plurality of paths and reform into a single path, and separate races may merge, at junctions. In some embodiments, races may be isolated from each other.

In some lens embodiments, the race may be of one or more material layers, such as one or more dielectric layers, with refraction indices different than the base material, one or more metallic layers, or one or more coating layers, or some combination thereof. The material layers can have different thicknesses, and can be of different or the same materials. The layers may be immediately adjacent to each other (e.g., stacked) or separated by any distance according to a direction of propagation of light through the race. A material layer can be offset from the terminating end so as to form a cavity between the offset layer and the terminating end. This offset layer can represent one or more materials in a layered stack with variable thicknesses. For configurations where the material layers are conductive, the layers of the stack on the termination end can be of the same material.

Figure 29C:
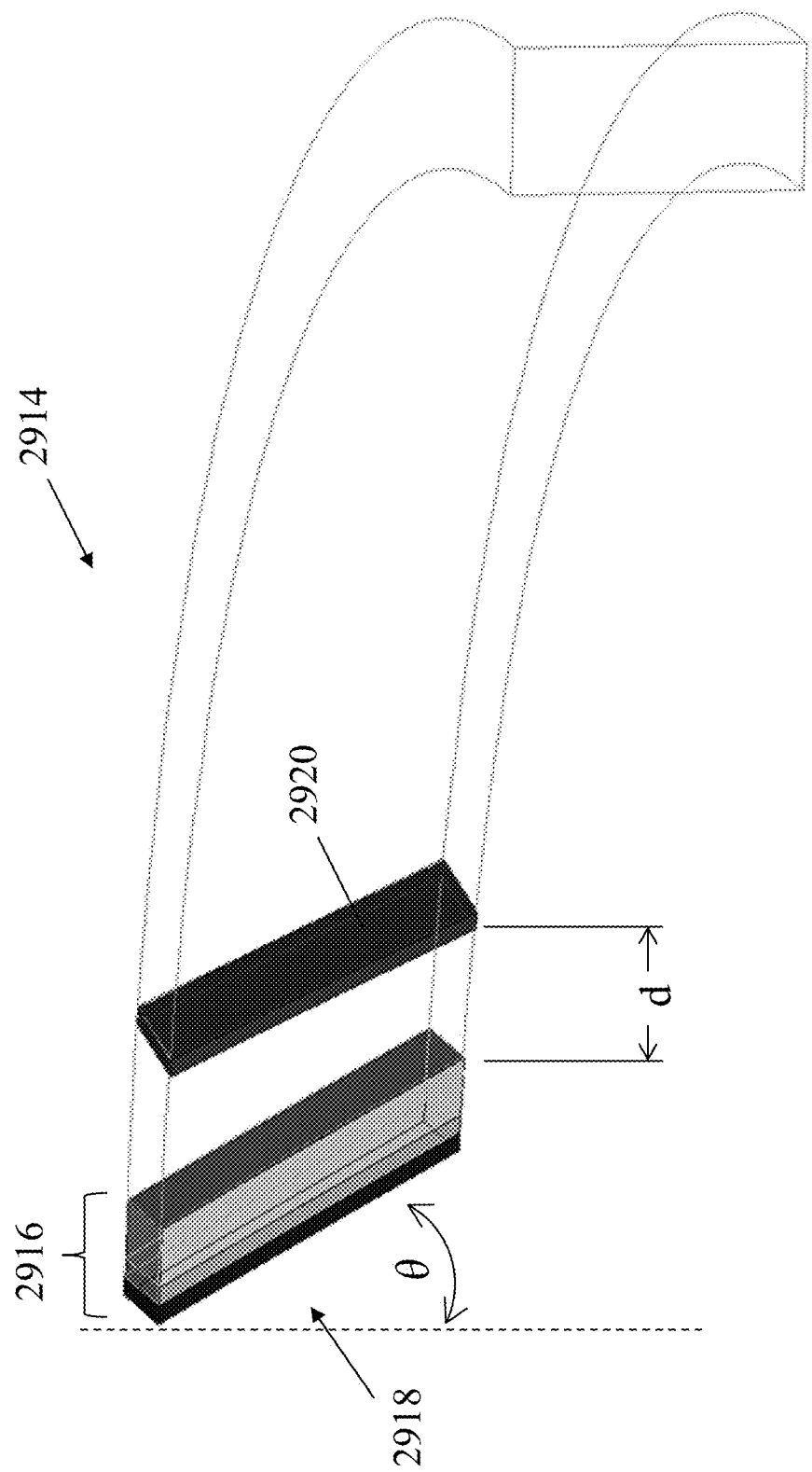
FIG. 29C illustrates example material layers of a race.

FIG. 29C shows an example of this arrangement. Therein, a hollow one-quarter-turn race 2914 having a rectangular section includes a layered material stacking sequence 2916 at a terminating end 2918, and a conductive material layer 2920 offset from the terminal end 2918. The angle shown is parametric and can assume numerous values to orient the terminal end relative to the incident wave. The distance d, locating the offset layer is a quarter of the wavelength for managing wave reflection. Anechoic coating schemes can achieve the same EM wave outcome while avoiding manufacturing issues associated with both the offset distance tolerance and angling for metallic layering.

When the material stack at the terminating end is composed of several dielectrics the layer offset from the terminating end can be a two-ply dielectric with different thicknesses. Such layering schemes and orientations can manage EM wave impedance and phase velocity. Layering schemes can also manage the outcome of the incident wave just as it strikes a layer surface.

For such ring lenses with one or more races, a race can excite laser sheets along the length of the race. Ignoring any end effects, for those races shown in FIG. 29B the maximum fan angles are 270 degrees for the race with the terminal end and 180 degrees for the race with both inlet and exit ports. Depending on coating deposits and the settings of the parameters discussed above the fan angles can vary. Races can enable a portion of or the total laser beam input to enter a race inlet, to traverse an internal geometry of a lens, and to provide a unique 3D curved laser sheet upon exiting a race outlet. The output can also be 2D. These 2D and 3D curved output scenarios can also be achieved with a race having a terminal end—or dead leg.

FIG. 29A depicts a toroidal full ring lens 2912 which has three ports connecting to two races with hollow circular sections of radius a, where two of the ports 2900, 2902 are inlets and the other an exit port 2904. The inlet ports 2900 and 2902 are configured to allow one or more laser beams into the lens where firing time can be leveraged. FIG. 29B illustrates the internal race circuits of the lens from FIG. 29A, where the trace of the exterior lens boundary is shown as circular curves along with the bounding curves that formed the arbitrary ring section. Race 1 (2906) has the convergent inlet port 2900 that leads to the divergent exit port 2904. Race 2 (2908) has the convergent inlet port 2902 that leads to a divergent terminating end 2910 interior to the lens. The ports 2900, 2902 and 2904 and termination end have surface 2610 that are generated from inclined lines that are revolved into cone like boundary surfaces. Moreover, cylindrical cuts are made nearest to the lens boundary which preceded the cone shaped inlet ports 2900, 2902. These geometric features can control the electro-magnetic wave forms as they traverse a particular lens. Race 1 (2906) traces a half circle, whereas Race 2 (2908) runs for a three-quarter turn while the circuit spirals gradually towards the lens center. Race 2 (2908) terminates at an end that had a wall perpendicular to the direction of wave travel, thus influencing an electromagnetic wave form traversing the race. Also on Race 2 (2908), by installing a widow in close proximity of the inlet port so as to seal the hollow race to from a chamber, the balance of the hollow race volume could be filled with other materials which are fluid, gaseous, vapor, plasma and/or colloids. Chamber designs can be installed on Race 2 (2908) or on any hollow race. This leveraging of materials can be applied to localized cavities that are embedded into a lens.

The surface on the terminating end of Race 2 (2908) is dielectric and oriented normal to the incident wave. It is known that for this configuration a reflective wave will be generated due to the termination surface having a reflection coefficient, r, greater than zero and less than unity for the general case. Again, standing wave patterns can be excited by combining the reflected wave with a part of the incident wave of equal amplitude. The balance of the incident wave gets transmitted into the remainder of the lens medium while carrying electromagnetic energy with it. If the surface of the terminating end is layered with a perfectly conducting material, a standing wave pattern would also be produced where the layer thickness is assumed sufficient to promote a standing wave. Under this scenario, a Poynting vector analysis shows that the energy carried into the race by the incident wave is on average carried away by the reflected wave. Hence, no electromagnetic energy would be transmitted through the balance of the lens material if the surface of the terminating end is layered sufficiently with a perfect conductor. In general, coatings and metallic material (layers) can be selectively deposited over lens surfaces, both internal and external to a lens.

Figure 30:
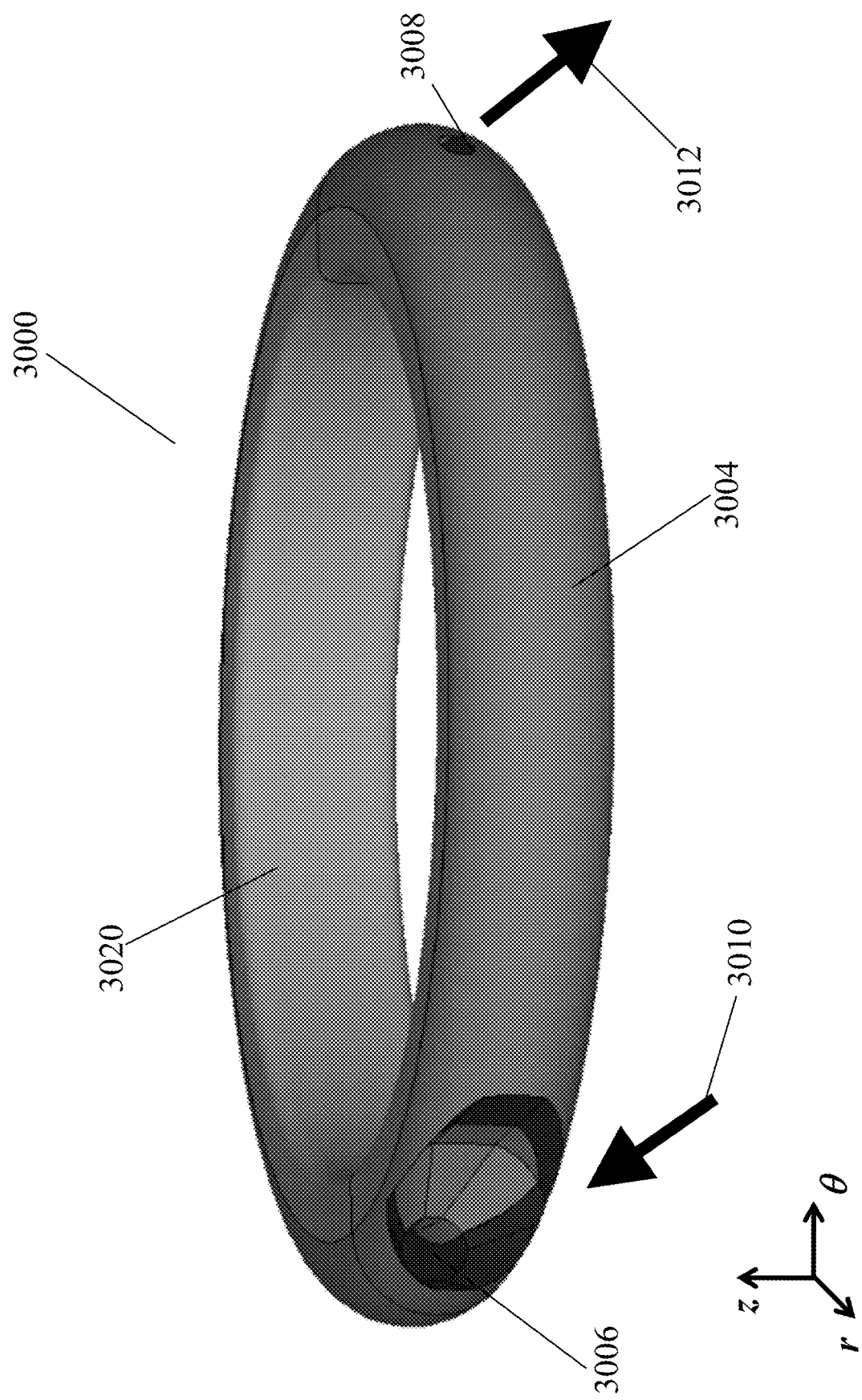
FIG. 30 illustrates an example full ring-shaped lens having both metallic and dielectric materials and ports.

FIG. 30 depicts a ring-like lens 3000 that has a dielectric material 3004 on the outboard region and a metallic material 3020 on the inboard region forming a composite lens. The inlet and exit ports 3006, 3008 are shown along with an incident ray 3010 and exit ray 3012. The section of this lens is chained together to form a D-shaped exterior boundary where half of a circle is on the dielectric portion and including straight curves with fillets on the metallic portion. A straight curve separates the two different materials at the interface.

Figure 31:
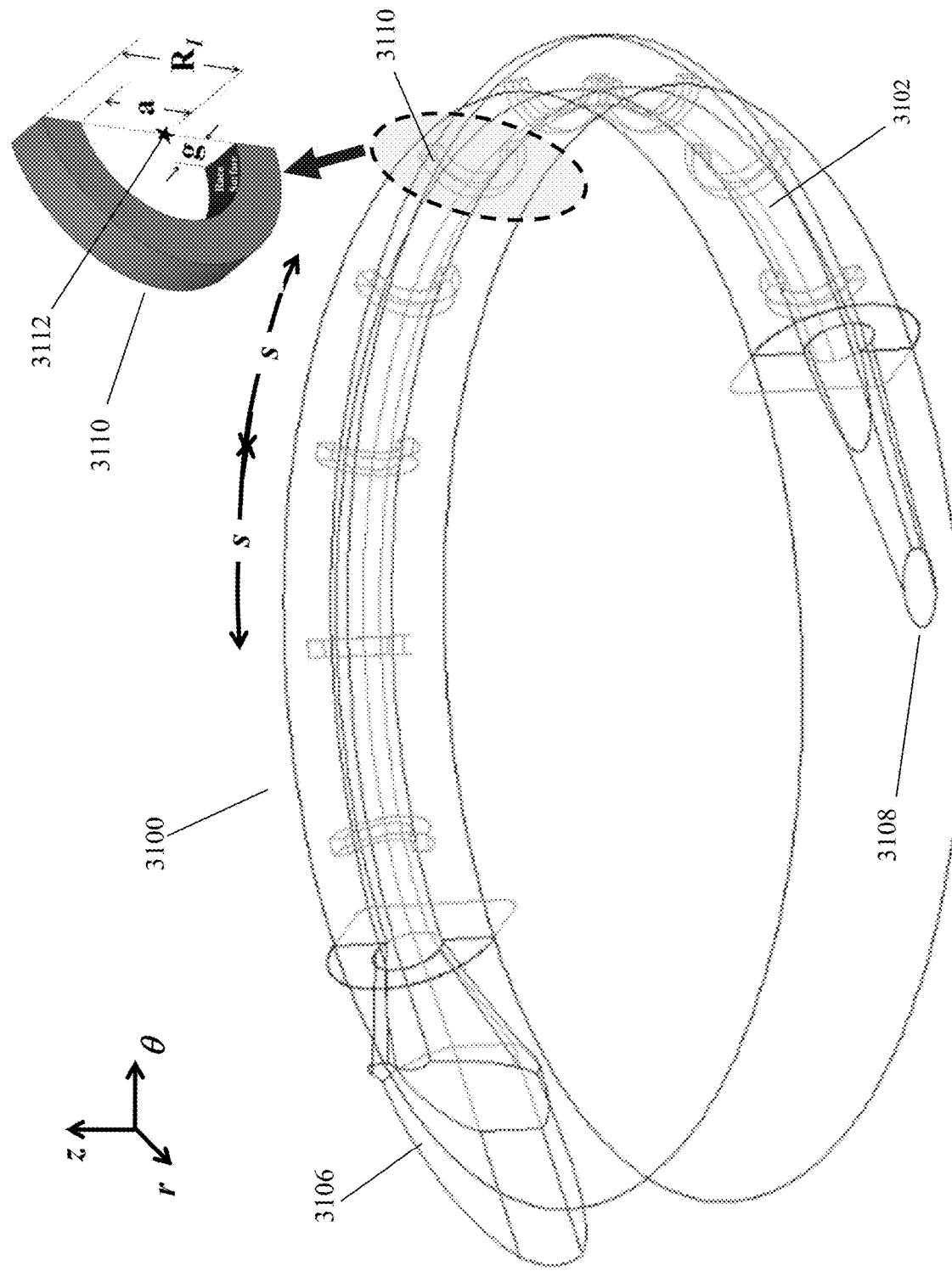
FIG. 31 illustrates an example full ring-shaped lens having races and ports and metallic internal portions.

Turning next to FIG. 31, a trace of a lens section is included along with the internal features of the lens 3100. As can be seen, the hollow race 3102 of section radius, a, is a circle relative to the lens 3100 in plan form, where both inlet and exit ports 3106, 3108 are convergent. Looking down the axis of revolution for any tangential location, both the race 3102 and inlet port 3106 have two flat surfaces with two diametrically opposed unit normal vectors (not shown) along the radial direction mostly, while the exit port 3108 has one flat surface with a unit normal pointing along the inboard direction due to the exit direction. The race 3102 has nine features in the form of half circular disc like washers 3110 that are cut into the race on the inboard portion in a periodic fashion 20 degrees apart from one another. The dimensions of the radial cut features 3110—relative to the metallic portion of the lens 3100—have lens material removed from the race surface at radius, a, to a depth into the lens material of radius $R_1$. These features 3110 have a relatively narrow gap thickness, g, cutout from the lens as well and the gap is centered from the midpoint of the race by a distance, s. The expanded half circular disc feature 3110 of FIG. 31 shows star 3112 representing the washer radial center.

For transverse magnetic waves (TM) traveling along the race, all of the electromagnetic components considered are dependent on the global radial and tangential coordinates only. The electric field components of significance act along the radial and tangential directions whereas the magnetic component of significance acts in the direction of the revolution axis. The differential form of Ampere's Law as it appeared in Maxwell's Equations indicated that a change in geometry of a conducting medium which a magnetic field travels across can generate an electric current. As a TM wave washed through the race from the inlet port it encountered a geometric expansion due to the gap cutout where the magnetic component excited a current as per Ampere's Law. This current is shorted in the gap and the current also produced electric and magnetic field components which are essentially constant over the gap—ignoring the higher order fringing fields at the gap edges.

In particular, the tangential electric field component over the gap length, g, jumps from zero at the leading gap edge to a limiting value $E_o$ across the gap region and then back to zero as it reaches the trailing gap edge where the race section became symmetric again, yielding a distribution that approximated one tooth of a periodic square wave—neglecting edge effects. This pop in the electric field occurs at all of the gaps which are in periodic series with respect to the metallic race conductor thereby generating a periodic square wave. Both forward traveling and backward traveling spatial harmonic waves are excited, where the set of spatial harmonics are physically coupled to each other by the periodic interaction between the boundary surfaces of the gap collection. The boundaries described by the race radius a, the periodic spacing of the feature cutouts s, and the gap thickness g, and the number of harmonics excited among other variables influence the electric field components of the spatial harmonics, while the radial gap depth $R_1$ among other variables influences the magnetic field component of the spatial harmonics. The phase constant is inversely proportional to the gap spacing s among other variables. This implies that for the set of backward and forward traveling spatial harmonic waves the corresponding cutoff frequency, phase velocity, and group velocity can be tuned to satisfy many service requirements. Likewise, the electromagnetic field components can be tuned for a variety of service requirements. Other periodic features, similar to the half washer disclosed herein, can excite and manage spatial harmonics of electromagnetic waves as well. The lens configuration of FIG. 31 depicts how a composite dielectric and metallic material combined with a race and race features can be implemented to enhance the electromagnetic wave forms while traversing a lens.

As with all of the aforementioned race features, coatings can be applied over all of the surfaces or portions judiciously selected thereof to manage a laser light wave as it enters, traverses through, and exits a lens. Similarly, localized coatings, films, and metallic coatings and metallic layers can be deposited over regions of the lens surface. Stacked dielectric coating thickness dimensions can affect EM impedance.

Figure 32:
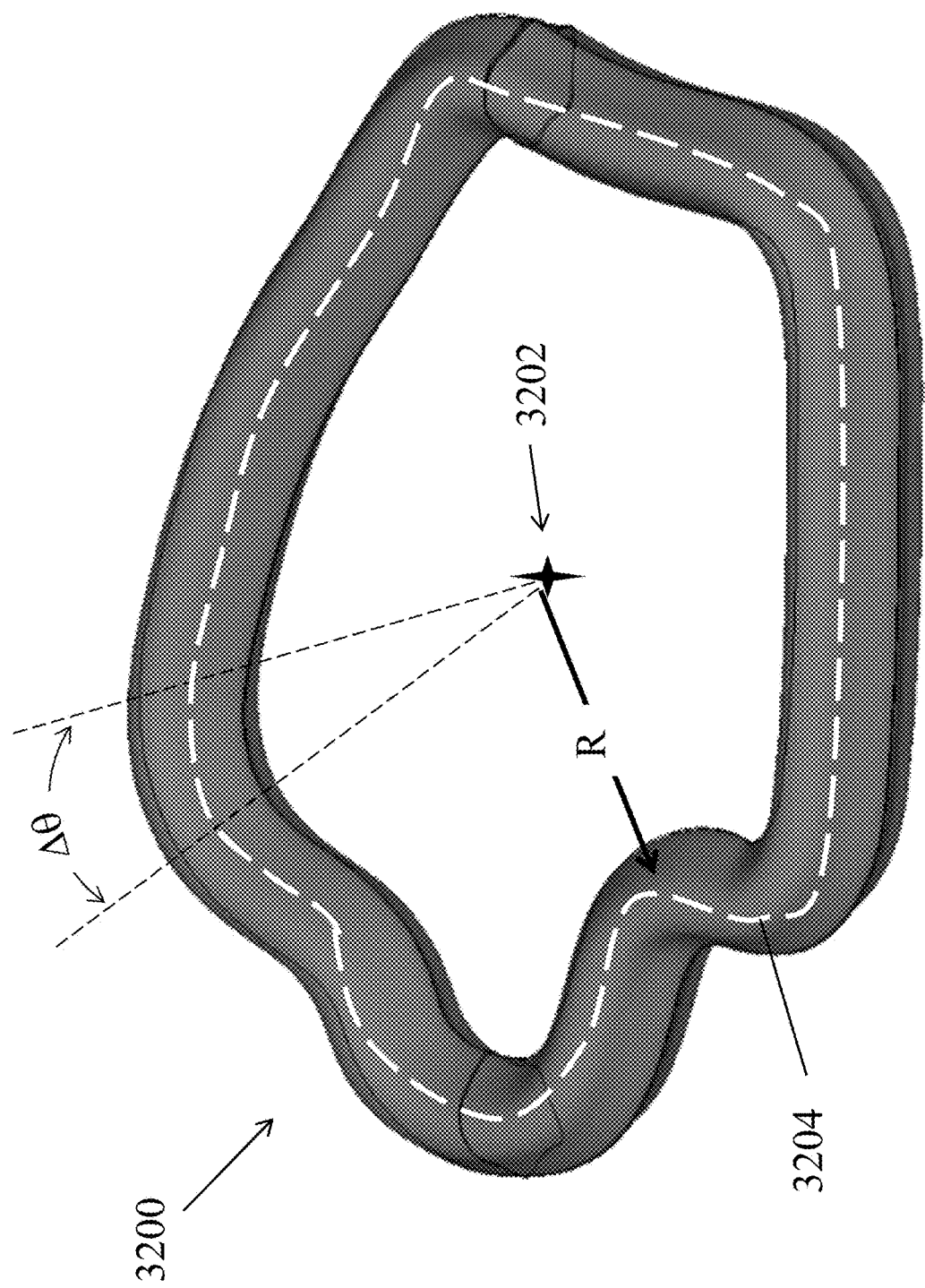
FIG. 32 illustrates a generalized example full ring-shaped lens, which can be divided into numerous ring sectors.

Turning now to FIG. 32, rings that are not full rings are referred to as ring segments or ring sectors. Ring 3200 illustrates a full ring, from FIG. 9, swept from a general section along a tortuous path. The radius, R, from the centroid 3202 of the ring 3200 to the centroid 3204 of the ring section varies with path location. The ring centroid 3202 is identified in ring 3200 and the section centroid 3204 is represented by the dashed line passing through the centroid of the lens sections. By replacing the arbitrary lens section of ring 3200 with definite geometry, practical lenses can be manufactured, where the dimensions are dependent on the service requirements. The angular tangential increment ΔΘ along the path swept out by the section represents a sector or segment of the ring of arbitrary shape. Lens segments with segment angle ΔΘ having practical sections that can be swept about any path where the sections are simply connected without cavities, simply connected with one cavity, and/or multiply connected. Composite lens segments 3300-3308 are depicted in FIG. 33, having metallic materials vii and dielectric materials viii. These lens segments 3300-3308 can be discrete lens segments or can be representative chunks of lenses of full rings in other embodiments. Various of said segments 3300-3308 can be utilized to form a ring lens 3200 or similar ring lenses. Further these segments 3300-3308 can have simply connected sections as in segments 3306 and 3308, or multiply connected sections as in segments 3302, 3304. Additionally, the lens 3310 has a tapered wall thickness that forms a slot in the lens. In some embodiments, the metallic material may be interchanged with a dielectric material different than that wrapped around the original metallic. Similarly, other combinations of metallic and dielectric materials are envisioned within the scope of the present disclosure.

Figure 34B:
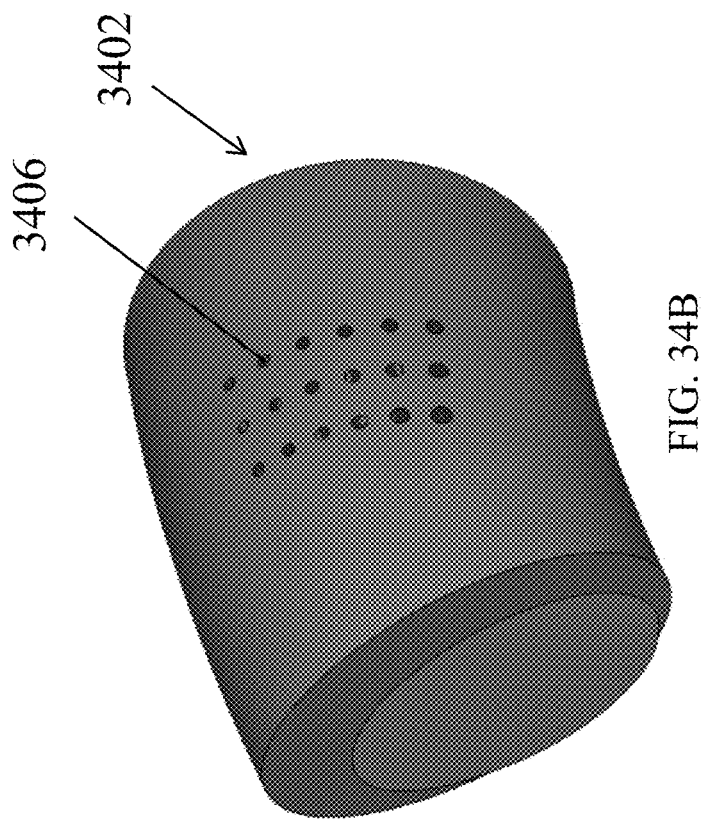
FIG. 34B depicts an example ring sector having a plurality of apertures (or grids) at an exterior thereof.
Figure 34A:
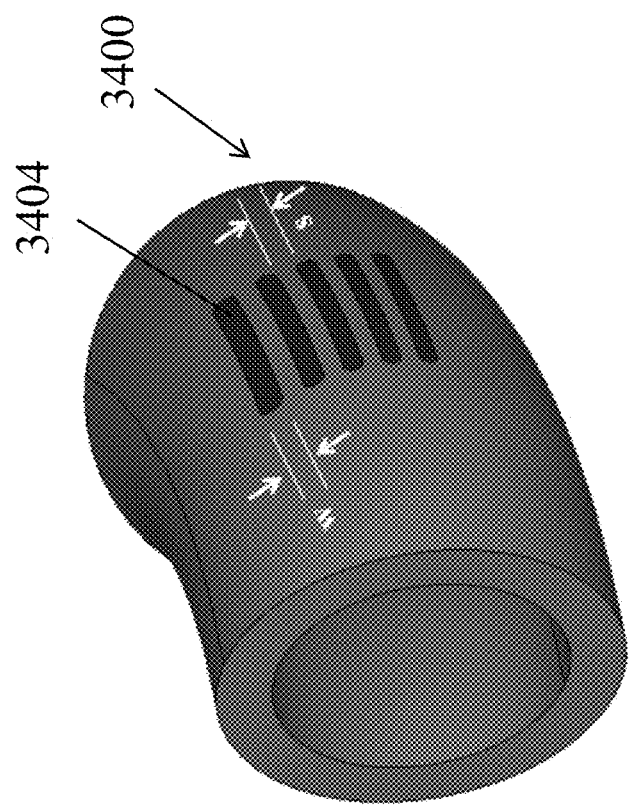
FIG. 34A depicts an example ring sector having a plurality of gratings at an exterior thereof.

Turning last to FIGS. 34A and 34B, lens segments 3400 and 3402 are shown with gratings 3404 or apertures 3406 therethrough to a central cavity. FIG. 34A illustrates a multiply connected lens segment with a coating or layering, or by other means known to those with ordinary skill in the art selectively deposited or layered over the lens exterior forming gratings 3404. The gratings 3404 have a width, w, and are separated by spacing, s, as shown in the figure. The width and/or spacing may be uniform or non-uniform. Leaky laser light cannot pass through the gratings and can diffract into various diffraction orders. The gratings 3404 shown in FIG. 34B can be thought of as providing an opposite effect as apertures. For example, the gratings 3404 can redirect leaky laser light passing therethrough while the surrounding surface area (between the grating) can emit redirected leaky laser light.

FIG. 34B illustrates an array of radiating apertures 3406, by coating with films or thin layering or by other means known to those with ordinary skill in the art the exterior lens surface of lens segment 3402. These apertures 3406 may be selectively placed onto the surface of a lens. In the example of FIG. 34B, the apertures 3406 are on the surface of a simply connected dielectric lens that has a crescent section having one cavity which wrapped around a metallic material. The apertures 3406 may be arranged uniformly or with non-uniform spacing, size, and/or shape. Leaky laser light can pass through the apertures 3406 while the balance of the external surface does not facilitate the passage of EM waves. As aperture size decreases, the radiation spreading increases. Thus, the geometry of these features can affect radiation output. For apertures, the radiation intensity emitted can be separated into two distinct zones. The near field zone is known as the Fresnel diffraction zone, while the far field is known as the Fraunhofer diffraction zone.

In other embodiments, the features shown in FIG. 34B may be considered grids formed on the exterior lens surface. Such grids are akin to the grating features. In other words, where apertures pass leaky laser light (and the remaining portion of the lens surface may block light passage), grids may take the form of apertures but block the passage of light therethrough (and thus the remaining portion of the lens may permit the leaky light passage).

While the features of FIG. 34A are shown with uniform spacing, size and shape, in other embodiments these features can be non-uniform in terms of spacing, size, and/or shape, and a mixture thereof. Similarly, while the features 3402 of FIG. 34B are shown with non-uniform spacing, size and shape, in other embodiments these features can be uniform in terms of spacing, size, and/or shape and a mixture thereof. These grating and aperture schemes, and grid schemes, can be applied to any lens configuration. Surface conditioning can be used to prepare the host surface for coating and layering of these features or surface conditioning can be used alone to produce and/or enhance similar output effects. Surface conditioning can be done by a plurality of etching techniques such as but not limited to microchemical etching, selective laser ablation, mechanical ablative/mechanical surface conditioning techniques or other techniques known in the industry. The output effects and/or enhancements include but are not limited to tailoring of the amplitude of the leaky light output and/or changing the apparent sheet thickness or width at selected positions across the span of the laser sheet.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents. Finally, it should be understood that the figures herein are not necessarily drawn to scale.

What is claimed is:

1. A lens configured to transform an impinging laser beam into a laser sheet, the lens comprising:
   an exterior surface defined by at least one curve rotated along a path about a centroid of the lens; and
   at least one section having an outer perimeter defined by the at least one curve, and a cavity defined by an inner surface of the lens, wherein:
   the lens is configured to transform the laser beam into a 2D laser sheet or a 3D laser sheet based on a relative incident angle of the laser beam on the lens,
   the lens is a prism, ring, disc, plate, shell, or solid volumes, and
   the laser sheet has a fan angle up to and including 360 degrees based on an incident location of the laser beam on the lens, a distance between a source of the laser beam and the centroid of the lens, and a distance between the centroid of the lens a projection surface of the laser sheet.

2. The lens according to claim 1, wherein the plurality of curves are chained together to define the exterior surface of the lens.

3. The lens according to claim 1, wherein the lens has a Dupin cycloid shape.

4. The lens according to claim 1, wherein at least a portion of the inner surface or the exterior surface of the lens is coated, has a deposition thereon, or is of a material different from a base material of the lens.

5. The lens according to claim 1, wherein at least a portion of the inner surface or an inboard region of the exterior surface comprises a reflective coating.

6. The lens according to claim 1, wherein the at least one section is at least partially metallic, and wherein a base material of the lens is a dielectric.

7. The lens according to claim 1, wherein at least a portion of the exterior surface of the lens comprises a coating selectively deposited thereon so as to form gratings, grids, or apertures on the exterior surface.

8. The lens according to claim 7, wherein the plurality of gratings or apertures are spaced apart and/or sized non-uniformly.

9. The lens according to claim 1, further comprising a race.

10. The lens according to claim 1, further comprising a solid race extending about the exterior surface of the lens and projecting from the exterior surface of the lens.

11. The lens according to claim 1, wherein the at least one section is simply connected.

12. The lens according to claim 1, wherein the at least one section is multiply connected.

13. A lens configured to transform an impinging laser beam into a laser sheet, the lens comprising:
an exterior surface defined by at least one curve rotated along a path about a centroid of the lens; and
a race extending through the lens between an inlet port at the exterior surface and an outlet port at the exterior surface or a terminating end within the lens, the race being configured to allow a portion of the laser beam to pass therethrough from the inlet port to the outlet port, wherein:
the lens is configured to transform the laser beam into a 2D laser sheet or a 3D laser sheet based on a relative incident angle of the laser beam on the lens, and
the laser sheet has a fan angle up to and including 360 degrees.

14. The lens according to claim 13, wherein the lens is a prism, ring, disc, plate, shell, or solid volume.

15. The lens according to claim 14, wherein the fan angle is based on an incident location of the laser beam on the lens, a distance between a source of the laser beam and the centroid of the lens, and a distance between the centroid of the lens and a projection surface of the laser sheet.

16. The lens according to claim 13, further comprising a solid race extending about the exterior surface of the lens and projecting from the exterior surface of the lens.

17. The lens according to claim 13, wherein the race comprises a plurality of sections having different shapes.

18. The lens according to claim 13, wherein the race is at least partially filled with a solid, fluid, gas, colloid, plasma, and/or vapor.

19. The lens according to claim 13, comprising a plurality of races extending through the lens between a plurality of respective inlet and outlet ports and/or inlet ports and terminating ends.

20. The lens according to claim 13, wherein the race splits into a plurality of paths at a first junction, and reforms into a single path at a second junction.

* * * * *